(12) United States Patent
Sasaki et al.

(10) Patent No.: US 10,732,341 B2
(45) Date of Patent: Aug. 4, 2020

(54) OPTICAL BODY, METHOD FOR MANUFACTURING OPTICAL BODY, AND LIGHT-EMITTING APPARATUS

(71) Applicant: DEXERIALS CORPORATION, Tokyo (JP)

(72) Inventors: Koji Sasaki, Tokyo (JP); Hiroshi Sugata, Tokyo (JP); Naoki Hanashima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/145,840

(22) Filed: Sep. 28, 2018

(65) Prior Publication Data

US 2019/0101685 A1    Apr. 4, 2019

(30) Foreign Application Priority Data

Sep. 29, 2017  (JP) .................................. 2017-191539

(51) Int. Cl.
*F21V 8/00* (2006.01)
*G02B 3/00* (2006.01)

(52) U.S. Cl.
CPC ......... *G02B 6/0036* (2013.01); *G02B 3/0056* (2013.01); *G02B 6/0053* (2013.01); *G02B 6/0055* (2013.01); *G02B 6/0065* (2013.01)

(58) Field of Classification Search
CPC .. G02B 3/0056; G02B 6/0036; G02B 6/0053; G02B 6/0055; G02B 6/0065
See application file for complete search history.

(56) References Cited

U.S. PATENT DOCUMENTS

| 8,638,408 B2* | 1/2014 | Wang | G02B 3/0043 349/62 |
| 8,651,720 B2* | 2/2014 | Sherman | B44F 1/045 362/560 |
| 2003/0214718 A1* | 11/2003 | Kaminsky | G02B 5/0221 359/599 |
| 2006/0291065 A1* | 12/2006 | Hasei | G02B 3/0012 359/619 |

(Continued)

FOREIGN PATENT DOCUMENTS

| JP | 2010-190599 A | 9/2010 |
| WO | WO 2016/103980 A1 | 6/2016 |

OTHER PUBLICATIONS

Feb. 18, 2019, European Search Report issued for related EP Application No. 18197895.8.

(Continued)

*Primary Examiner* — Peggy A Neils
(74) *Attorney, Agent, or Firm* — Paratus Law Group, PLLC

(57) ABSTRACT

There is provided an optical body including: a base material; a second optical layer, formed on at least one surface of the base material, that reduces a reflection of extraneous light; and a first optical layer, laminated on top of a part of the second optical layer, that extracts internally propagating light incident inside the base material from a side face of the base material to an outside of the base material. On a surface of the first optical layer, a first concave-convex structure that reflects the internally propagating light is formed.

13 Claims, 19 Drawing Sheets

(56) References Cited

U.S. PATENT DOCUMENTS

| | | | |
|---|---|---|---|
| 2013/0121022 A1* | 5/2013 | Park | G02B 5/021 |
| | | | 362/607 |
| 2014/0160764 A1 | 6/2014 | Sherman et al. | |
| 2017/0208878 A1 | 7/2017 | Kakinuma et al. | |
| 2017/0348943 A1* | 12/2017 | Kajiya | B32B 7/02 |
| 2018/0224581 A1* | 8/2018 | Takayama | G02B 3/06 |
| 2018/0364411 A1* | 12/2018 | Harada | G02B 6/0038 |

OTHER PUBLICATIONS

Nov. 14, 2019, European Communication issued for related EP Application No. 18197895.8.
Oct. 1, 2019, European Office Action Response issued for related EP Application No. 18197895.8.

* cited by examiner

OPTICAL BODY, METHOD FOR MANUFACTURING OPTICAL BODY, AND LIGHT-EMITTING APPARATUS

CROSS REFERENCE TO RELATED APPLICATIONS

This application claims the benefit of Japanese Priority Patent Application JP 2017-191539 filed Sep. 29, 2017, the entire contents of which are incorporated herein by reference.

BACKGROUND

The present invention relates to an optical body, a method for manufacturing an optical body, and a light-emitting apparatus.

As disclosed in JP 2010-190599A, for example, an optical body combining the waveguide phenomenon of light and a macro concave-convex structure is known as one type of optical body. Such an optical body is also called a light guide panel. A macro concave-convex structure is formed on the surface of one side of the light guide panel. Additionally, inside the light guide panel, light is incident from a light source provided on a side face of the light guide panel. Light incident inside the light guide panel, or in other words, internally propagating light, propagates inside the light guide panel while reflecting off the surface of the light guide panel (that is, the interface between the interior and the exterior of the light guide panel). After that, the internally propagating light reflects off the surface of the macro concave-convex structure, and is emitted from the surface on the other side of the light guide panel. In other words, in the light guide panel, light incident from the side face of the light guide panel is emitted from the surface of the light guide panel. The light guide panel is used as a luminous body used with any of various types of display apparatus, or as a luminous body used for illumination, for example. Examples of display apparatus in which a light guide panel is used include various types of LCDs (for example, local dimming LCDs), passive-type display apparatus, light ornament panels for amusement facilities, illuminated panels for advertising such as digital signage, and the like. In these display apparatus, by turning a light source on and off, an expression becomes possible in which light appears to float up from the sites where the pattern of the macro concave-convex structure is formed. Consequently, the region in which the macro concave-convex structure is formed becomes a light-emitting region. Depending on the shape of the light-emitting region, various designs (such as the numerals of a speedometer) are expressed.

Meanwhile, as disclosed in JP 2010-190599A, in the region where the macro concave-convex structure is not formed on the surface of the light guide panel, a micro concave-convex structure for reducing reflections of extraneous light is often formed. A micro concave-convex structure is a concave-convex structure in which the average cycle of concavities and convexities is lower than the visible light wavelength band.

Consequently, both a macro concave-convex structure and a micro concave-convex structure are often formed on the surface of the light guide panel. The method for manufacturing the light guide panel may be a method for producing a master whose surface shape is the inverse of the surface shape of the light guide panel, and transferring the surface shape of the master onto the base material of the light guide panel.

SUMMARY

However, with this method, it is necessary to form the macro concave-convex structure and the micro concave-convex structure selectively on the surface of the master. In other words, on the surface of the master, it is necessary to form the macro concave-convex structure in a region corresponding to the light-emitting region, and form the micro concave-convex structure in the surrounding region. Furthermore, since these concave-convex structures have concavities and convexities which are completely different in size, it is necessary to form the concave-convex structures on the master by separate steps. Furthermore, the region where the macro concave-convex structure is formed, that is, the light-emitting region, must be positioned accurately. Consequently, there is a problem due to the large amount of effort involved in the manufacturing of the master. Particularly, in the case in which high precision or yield of the master is demanded, the effort required to manufacture the master becomes even greater. Additionally, with this method, it is necessary to manufacture a master for every shape (that is, design) of the light-emitting region. For this reason, there is a problem in that production of the light guide panel takes great effort, and productivity is poor.

Accordingly, it is desirable to provide a novel and improved optical body, method for manufacturing an optical body, and light-emitting apparatus which can be produced more easily.

According to an embodiment of the present invention, there is provided an optical body including: a base material; a second optical layer, formed on at least one surface of the base material, that reduces a reflection of extraneous light; and a first optical layer, laminated on top of a part of the second optical layer, that extracts internally propagating light incident inside the base material from a side face of the base material to an outside of the base material. On a surface of the first optical layer, a first concave-convex structure that reflects the internally propagating light is formed.

Here, the first concave-convex structure may be formed randomly.

An RSm of the first concave-convex structure may be from 30 µm to 210 µm.

In a case in which a cross-sectional shape of the first concave-convex structure is a random shape, an RSm/Ra of the first concave-convex structure may be 140 or less.

The first concave-convex structure may be formed periodically.

The first optical layer may include a cured ultraviolet-curing resin.

On a surface of the first concave-convex structure, a highly reflective film including at least one selected from the group consisting of Al, Ag, and alloys thereof, or a white-based ink film, may be formed.

The second optical layer may include a second concave-convex structure in which an average cycle of concavities and convexities is lower than a visible light wavelength band.

The second optical layer may include a laminated film in which a high refractive index film and a low refractive index film are alternately laminated.

According to another embodiment of the present invention, there is provided a method for manufacturing an optical body that manufactures the optical body described above, the method including: forming the second optical layer on at least one surface of the base material; printing an uncured resin layer on top of a part of the second optical layer; and curing the uncured resin layer and also forming a first concave-convex structure on a surface of the cured resin layer.

According to another embodiment of the present invention, there is provided a light-emitting apparatus including: the optical body described above; and a light source, provided on a side face of the optical body, that causes light to be incident inside the optical body from the side face of the optical body.

According to the present invention as described above, since the first optical layer is formed on top of part of the second optical layer, the resin layer that acts as the base of the first optical layer can be formed by printing. Since it is sufficient to print the resin layer to form a desired design, when forming the first concave-convex structure, it is not necessary to prepare a master for every design. In other words, a common master regardless of the type of design can be used to form the first concave-convex structure. Furthermore, it is not necessary to form the first concave-convex structure and the micro concave-convex structure described above on a single master. Consequently, the optical body can be produced more easily.

DETAILED DESCRIPTION OF THE EMBODIMENT(S)

Figure 1:
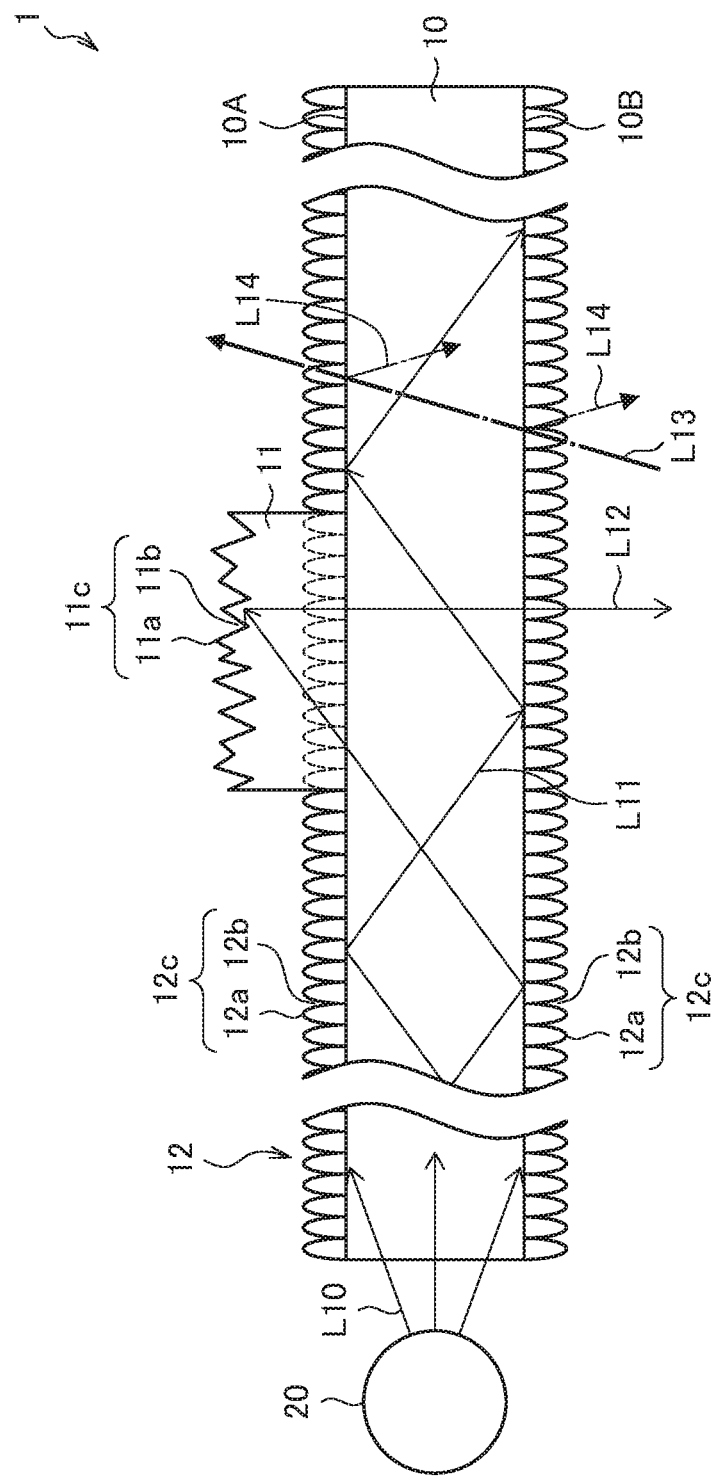
FIG. 1 is a lateral cross-section view illustrating a diagrammatic configuration of an optical body according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration of Optical Body>

Next, a configuration of an optical body 1 according to the present embodiment will be described on the basis of FIGS. 1 to 2D. The optical body 1 is a member also referred to as a light guide panel, and is provided with a base material 10, a first optical layer 11, and a second optical layer 12. The second optical layer 12 is formed on the entirety of both faces (surfaces 10A and 10B) of the base material 10. The first optical layer 11 is formed on a partial region on top of the second optical layer 12 formed on the surface 10A side.

The base material 10 propagates light incident inside the base material 10, or in other words internally propagating light, in the planar direction of the base material 10 (that is, the directional perpendicular to the thickness direction, which is the horizontal direction in FIG. 1). Consequently, the base material 10 preferably is a resin with excellent photoconductivity, and preferably is a thermoplastic resin. Examples of such a resin include acrylic resins (such as poly methyl methacrylate), polycarbonate, A-PET, cycloolefin copolymers, and cycloolefin polymers. Also, the base material 10 may be an inorganic material with excellent photoconductivity. Examples of such an inorganic material include silicon-based materials, more specifically glass and the like. The thickness of the base material 10 is not particularly limited, and it is sufficient to adjust the thickness appropriately in accordance with the use and the like of the optical body 1.

The first optical layer 11 is formed on top of part of the second optical layer 12 formed on the surface 10A side. The first optical layer 11 includes a first concave-convex structure 11c formed on the surface thereof. The first concave-convex structure 11c includes large numbers of first convexities 11a and first concavities 11b. The first convexities 11a have a shape protruding outward in the thickness direction of the optical body 1, while the first concavities 11b have a shape depressed inward in the thickness direction of the optical body 1.

The first optical layer 11 extracts and emits internally propagating light to the outside of the optical body 1. The line L10 in FIG. 1 illustrates the optical path of incident light incident inside the base material 10 from a light source 20, the line L11 illustrates the optical path of internally propagating light, and the line L12 illustrates the optical path of light extracted to the outside, or in other words, extracted light. In other words, internally propagating light reaching the first optical layer 11 is reflected (scattered) by the first concave-convex structure 11c, and by the diffraction phenomenon of light, emitted to the outside from the surface 10B. The first optical layer 11 is formed in sites where the extraction of light is desired on the surface 10A. By turning the light source 20 on and off, an expression becomes possible in which light appears to float up from the region where the pattern of the first optical layer 11 is formed, or in other words, the light-emitting region. Depending on the shape of the light-emitting region, various designs are expressed. The designs formed by the light-emitting region are various, including the frame, scale markings, and numerals of a speedometer or the like, for example. Obviously, the designs are not limited to these examples.

The first convexities 11a and the first concavities 11b are formed randomly on the surface of the first optical layer 11. Specifically, the pitch of the concavities and convexities of the first concave-convex structure 11c is random. The cross-sectional shape (the shape of the cross-section parallel to the thickness direction) of the first convexities 11a and the first concavities 11b is not particularly limited. The cross-sectional shape of the first concave-convex structure 11c may be random shapes (atypical shapes) formed by blasting or the like, or may be a specific shape (such as hemispherical, conical, pyramidal, cylindrical, quadrilateral, or bullet-shaped, for example). Regarding a concave-convex structure having circular or triangular pyramids or the like, or in other words, tapered shapes, the tapered faces may be planar or curved. In the case in which the tapered faces are planar, the angle obtained between the tapered faces and the planar direction of the base material 10 preferably is approximately 45 degrees, but may also be approximately from 25 to 75 degrees. Also, in the case in which the concave-convex structure has a hemispherical shape, although details will be described later, the maximum inclination angle preferably is in agreement with the maximum propagation angle. Obviously, the first concave-convex structure 11c is not limited to these examples, and it is sufficient to have the function of the present embodiment, or in other words, the function of extracting and emitting internally propagating light to the outside of the optical body 1.

Figure 2A:
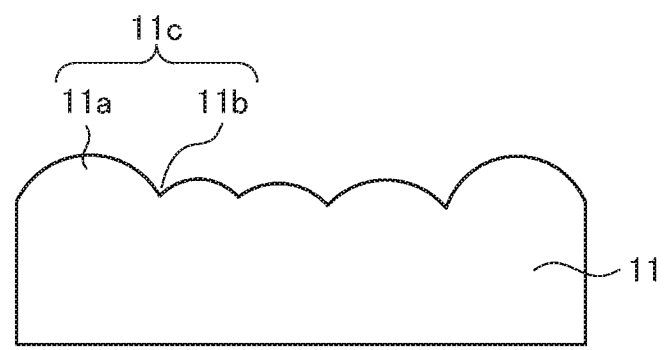
FIG. 2A is a lateral cross-section view illustrating an example of the first concave-convex structure.
Figure 2B:
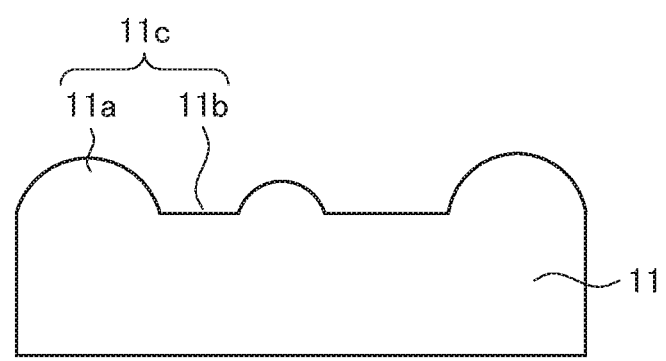
FIG. 2B is a lateral cross-section view illustrating an example of the first concave-convex structure.
Figure 2C:
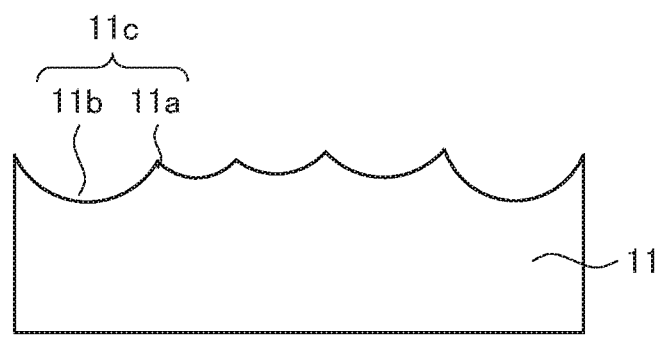
FIG. 2C is a lateral cross-section view illustrating an example of the first concave-convex structure.
Figure 2D:
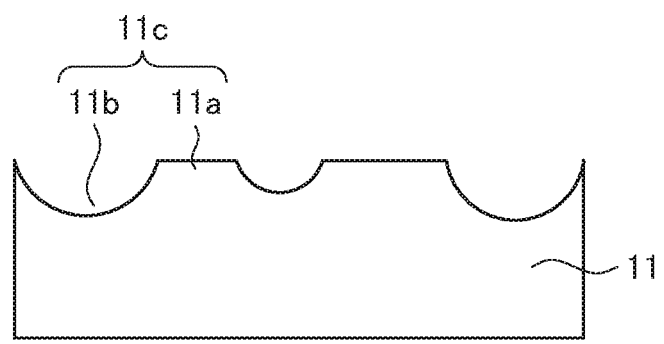
FIG. 2D is a lateral cross-section view illustrating an example of the first concave-convex structure.

In the case in which the cross-sectional shape of the first concave-convex structure 11c is a specific shape, either of the first convexities 11a and the first concavities 11b may have the specific shape. In the examples illustrated in FIGS. 2A and 2B, the first convexities 11a have the specific shape (herein, a hemispherical shape). In FIGS. 2C and 2D, the first concavities 11b have the specific shape (herein, a hemispherical shape). Note that in FIGS. 2A and 2C, the fill ratio of the first concave-convex structure 11c is 100%. Herein, the fill ratio is the ratio of the exclusive area occupied by the first convexities 11a or the first concavities 11b (whichever has the specific shape) with respect to the total area of the first optical layer 11. In the case of a fill ratio of 100%, the first convexities 11a or the first concavities 11b overlap each other. In FIGS. 2B and 2D, the fill ratio is less than 100%. From the perspective of raising the light extraction efficiency (extracting more internally propagating light to the outside) of the first concave-convex structure 11c, the fill ratio preferably is 100% or a value as close to 100% as possible. Here, the planar shape and cross-sectional shape of the first concave-convex structure 11c are measurable by scanning electron microscopy (SEM) or the like.

In this way, cases in which the first concave-convex structure 11c is formed randomly include the case in which the cross-sectional shape is a random shape (in this case, the pitch of the concavities and convexities inevitably becomes random), and the case in which the cross-sectional shape is a specific shape, and the pitch of the concavities and convexities is random.

RSm of the first concave-convex structure 11c preferably is from 30 μm to 210 μm. In this case, the light extraction efficiency of the first concave-convex structure 11c can be raised further. Herein, in the case in which the cross-sectional shape of the first concave-convex structure 11c is a random shape, the emitted luminance tends to decrease as RSm becomes higher. For this reason, an upper limit value on RSm is preferably 210 μm or less, more preferably 140 μm or less, and even more preferably 50 μm or less. Herein, RSm is the average length of a roughness curve element measured in compliance with ISO 25178, and Ra is the arithmetic average roughness measured in compliance with ISO 25178. RSm and Ra are measurable by a commercially available roughness gauge, for example.

Furthermore, in the case in which the cross-sectional shape of the first concave-convex structure 11c is a random shape, RSm/Ra of the first concave-convex structure 11c preferably is 140 or less. With this arrangement, the light extraction efficiency of the first concave-convex structure 11c can be raised further. Also, the light extraction efficiency tends to rise as RSm/Ra becomes smaller. Consequently, RSm/Ra preferably is 40 or less.

Herein, the first concave-convex structure 11c may also be formed periodically. In this case, the cross-sectional shape of the first concave-convex structure 11c becomes a specific shape. Furthermore, the pitch of the first convexities 11a and the first concavities 11b has periodicity. For example, similarly to the second concave-convex structure 12c described later, the first convexities 11a and the first concavities 11b are dispersively arranged in a matrix.

In the case in which the first concave-convex structure 11c is formed randomly, light of various frequencies can be extracted. For example, if the internally propagating light is white light, white light can be extracted. On the other hand, if the internally propagating light is monochromatic light, monochromatic light of the same frequency as the internally propagating light can be extracted. On the other hand, in the case in which the first concave-convex structure 11c is formed periodically, light of a frequency corresponding to the period or the like of the first concave-convex structure 11c can be extracted. For example, even if the internally propagating light is white light, light of a frequency corresponding to the period or the like of the first concave-convex structure 11c (for example, blue light) can be extracted.

Figure 3:
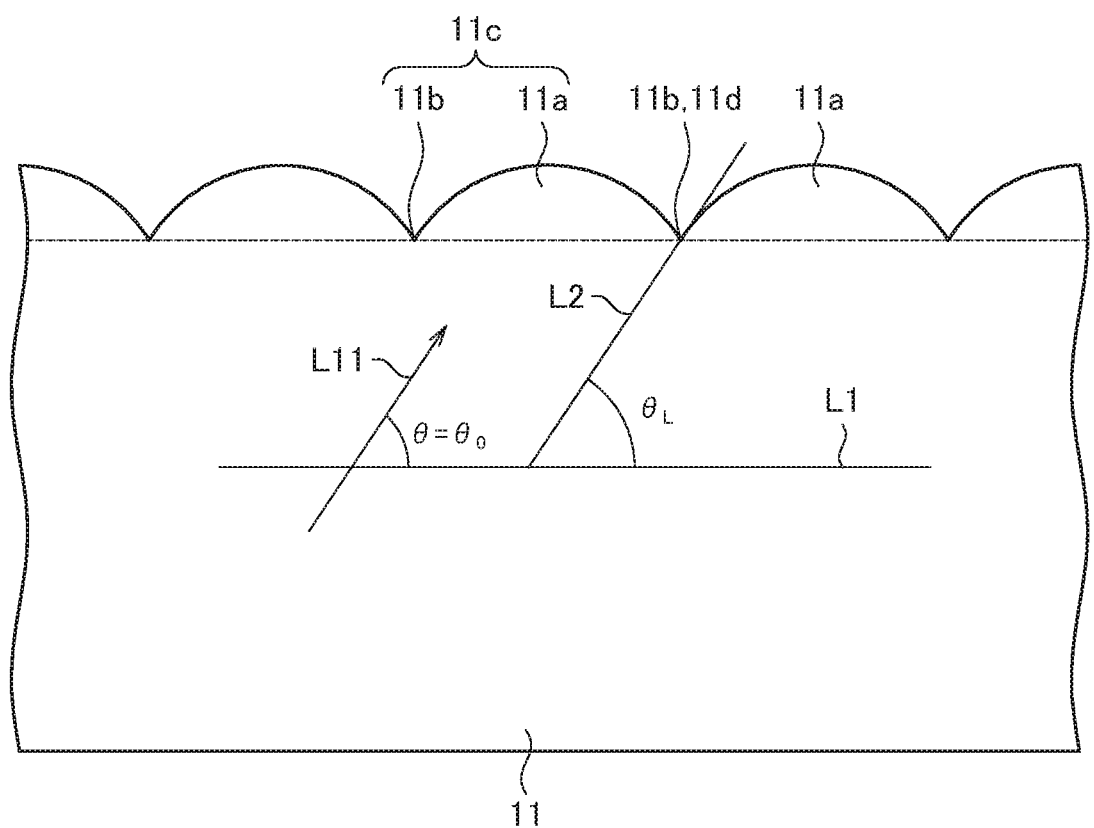
FIG. 3 is a lateral cross-section view illustrating an example of the first optical layer.

Herein, as illustrated in FIG. 3, in the case in which the first convexities 11a are hemispherical (also called a microlens shape), as the maximum inclination angle $\theta_L$ of the first convexities 11a becomes larger, the change in the propagation angle of the internally propagating light when the internally propagating light reflects off the surface of the first convexities 11a becomes larger. For this reason, the light extraction efficiency (radiation efficiency) becomes larger. Herein, the maximum inclination angle $\theta_L$ of the first convexities 11a is the angle obtained between a tangent line L2 at an edge 11d of the first convexities 11a and a line L1 (the line indicating the planar direction of the base material 10), and is expressed by the following Formula (1). Herein, in the case in which the edges 11d of adjacent first convexities 11a overlap each other (the case of FIG. 3), the edge 11d is the apex (the deepest part) of the first concavities 11b. The propagation angle of the internally propagating light is the angle θ obtained between the optical path of the internally propagating light (the line L11) and the line L1 (the line parallel to the planar direction of the first optical layer 11). Note that in FIG. 3, the propagation angle θ is in agreement with a maximum propagation angle $\theta_0$ described later. Notionally, the light extraction efficiency is the ratio of total light intensity of light incident on the optical body 1 from the light source 20 and the total light intensity of light emitted from the first optical layer 11.

On the other hand, if the maximum inclination angle $\theta_L$ of the first convexities 11a becomes too large, the reflection of internally propagating light at the surface of the first convexities 11a no longer fulfills the conditions for total reflection, and therefore part of the internally propagating light that reaches the first convexities 11a readily leaks out to the outside of the optical body 1 from the surface of the first convexities 11a. For this reason, the light extraction efficiency is actually lowered instead.

Consequently, the maximum light extraction efficiency may be considered to be the case in which the maximum inclination angle $\theta_L$ of the first convexities 11a is approximately in agreement with the maximum propagation angle $\theta_0$ of the internally propagating light. Herein, the maximum propagation angle $\theta_0$ of the internally propagating light is also referred to as the critical angle, and is expressed by the following Formula (2).

$$\theta_L = \sin^{-1}\left[\frac{p}{2R}\right] \quad (1)$$

$$\theta_0 = 90 - \sin^{-1}\left[\frac{1}{n}\right] \quad (2)$$

In Formula (1), p is the pitch (distance between apices) (μm) of the first convexities 11a, and R is the radius of curvature (μm) of the first convexities 11a. In Formula (2), n is the refractive index of the first optical layer 11. In Formulas (1) and (2), the value of $\sin^{-1}$ is converted to degree units. Note that in Formula (2), it is presupposed that the optical body 1 is used in air. In a case in which the optical body 1 is used in a surrounding environment other than air, the numerator "1" is replaced with a refractive index corresponding to the usage environment. In FIG. 3, the maximum inclination angle $\theta_L$ of the first convexities 11a is approximately in agreement with the maximum propagation angle $\theta_0$ of the internally propagating light.

Herein, the first concave-convex structure 11c includes multiple first convexities 11a. Due to reasons such as fabrication error, the shapes of the first convexities 11a are not exactly the same. Also, the case in which the shapes of the first convexities 11a are altered intentionally is also anticipated. Consequently, the maximum inclination angle $\theta_L$ of the first convexities 11a may change for every first convexity 11a. Accordingly, it is sufficient for the arithmetic average value of the maximum inclination angle $\theta_L$ computed for multiple first convexities 11a to be approximately in agreement with the maximum propagation angle $\theta_0$. Hereinafter, the arithmetic average value of the maximum inclination angle $\theta_L$ is also designated the "maximum inclination angle $\theta_{Ln}$ of the first concave-convex structure 11c".

Consequently, in the case in which the first convexities 11a are hemispherical, the maximum inclination angle $\theta_{Ln}$ of the first concave-convex structure 11c preferably is approximately in agreement with the maximum propagation angle $\theta_0$. This detail holds for both the case in which the first concave-convex structure 11c is formed randomly and the case in which the first concave-convex structure 11c is formed periodically. When computing the maximum inclination angle $\theta_{Ln}$ of the first concave-convex structure 11c, it is sufficient to sample several (for example, a few dozen) of the first convexities 11a, and compute the arithmetic average value of the maximum inclination angle $\theta_L$ for these.

"Approximately in agreement" is a concept that includes not only complete agreement, but may also include some degree of error. For example, if the error between the maximum inclination angle $\theta_{Ln}$ of the first concave-convex structure 11c and the maximum propagation angle $\theta_0$ is ±10 degrees or less, both may be considered to be approximately in agreement. To make the maximum inclination angle $\theta_{Ln}$ of the first concave-convex structure 11c and the maximum propagation angle $\theta_0$ be approximately in agreement, this error is preferably ±7 degrees or less, more preferably ±5 degrees or less, and even more preferably ±3 degrees or less.

In the case in which the maximum inclination angle $\theta_{Ln}$ of the first concave-convex structure 11c is approximately in agreement with the maximum propagation angle $\theta_0$, the light extraction efficiency can be raised.

On the surface of the first concave-convex structure 11c, a highly reflective film including at least one selected from the group consisting of Al, Ag, and alloys thereof, or a white-based ink film, is formed preferably. With this arrangement, the light extraction efficiency of the first optical layer 11 is improved further. In consideration of the design of the optical body 1, decorative printing and the like may also be performed. With this arrangement, light emission of a desired color is obtained.

Note that the thickness of the first optical layer 11 is not particularly limited, and it is sufficient to adjust the thickness appropriately in accordance with the properties demanded of the optical body 1 and the like.

As illustrated in FIG. 1, the second optical layer 12 reduces reflections of extraneous light, and is formed on nearly the entirety of the surfaces 10A and 10B of the base material 10. The line L13 illustrates the optical path of extraneous light. In the example of FIG. 1, extraneous light is incident on the surface 10B. The reflection of extraneous light incident on the surface 10B may occur not only on the surface 10B, but also on the surface 10A. The line L14 illustrates the optical path of reflected light. Reflections at the surface 10B are reduced by the second optical layer 12 on the surface 10B, while reflections of extraneous light at the surface 10A are reduced by the second optical layer 12 on the surface 10A.

The second optical layer 12 may also be formed on at least one of the surfaces 10A and 10B, but since the reflection of extraneous light may occur at any location on the surfaces 10A and 10B, the second optical layer 12 preferably is formed on nearly the entirety of the surfaces 10A and 10B.

The second optical layer 12 is provided with a second concave-convex structure 12c. The second concave-convex structure 12c reduces the reflection of extraneous light, and also reduces the leakage of internally propagating light to the outside. In other words, light emission is reduced in the region where the second optical layer 12 is formed. With this arrangement, a high contrast can be expressed between the region in which the first optical layer 11 is formed, that is, the light-emitting region, and the other region, that is, the non-light-emitting region.

The second concave-convex structure 12c includes large numbers of second convexities 12a and second concavities 12b. The second convexities 12a have a shape protruding outward in the thickness direction of the optical body 1, while the second concavities 12b have a shape depressed inward in the thickness direction of the optical body 1.

Herein, the second concave-convex structure 12c is observable by scanning electron microscopy (SEM), cross-sectional transmission electron microscopy (cross-sectional TEM), or the like, for example.

The second convexities 12a and the second concavities 12b are formed periodically on both faces of the base material 10. In other words, the pitch of the concavities and convexities of the second concave-convex structure 12c has periodicity. Specifically, the second convexities 12a and the second concavities 12b are dispersively arranged in a matrix (for example, a staggered or square lattice) on the surfaces 10A and 10B of the base material 10.

Additionally, in the case of treating the horizontal direction in FIG. 1 as the dot direction, and the direction perpendicular to the page in FIG. 1 as the track direction, the pitch of the concavities and convexities can be categorized into a pitch in the dot direction (what is called the dot pitch) P11, and a pitch in the track direction (what is called the track pitch) P12. More specifically, the dot pitch P11 is the distance between the apices of the second convexities 12a adjacent in the dot direction, while the track pitch P12 is the distance between the apices of the second convexities 12a adjacent in the track direction. The dot pitch P11 and the track pitch P12 are both fixed values. Additionally, the arrangement of the second convexities 12a may also be a staggered arrangement. The dot pitch P11 and the track pitch P12 may be the same or different. In addition, the dot pitch P11 and the track pitch P12 may also vary on a fixed period. For example, the dot pitch P11 may vary in the mode of a sinusoidal sweep in the row direction. Also, the shapes of the second convexities 12a are all approximately the same. The second concave-convex structure 12c formed on the surface 10A on one side of the base material 10 and the second concave-convex structure 12c formed on the surface 10B on the other side may be the same or different. The cross-sectional shape of the second convexities 12a is a bullet shape, but obviously may also be another shape (such as hemispherical, conical, pyramidal, cylindrical, or quadrilateral, for example).

Furthermore, the average cycle of the concavities and convexities of the second concave-convex structure 12c is lower than (a minimum value of) the visible light wavelength band. Herein, the average cycle of the concavities and convexities is given as the arithmetic average value of the dot pitch P11 and the track pitch P12. For example, multiple pairs of second convexities 12a adjacent in the row direction and pairs of second convexities 12a adjacent in the column direction are sampled, and the dot pitch P11 and the track pitch P12 are computed therefrom. Subsequently, it is sufficient to take the arithmetic average value of the computed pitches as the average cycle of the concavities and convexities.

Additionally, the average cycle of the concavities and convexities of the second concave-convex structure 12c is lower than the visible light wavelength band, as described above. For example, the average cycle of the concavities and convexities is less than 350 nm, preferably less than 280 nm, and more preferably less than 270 nm. The lower limit value of the average cycle of the concavities and convexities is not particularly limited, but from the perspective of forming the second concave-convex structure 12c consistently, the lower limit value preferably is 100 nm or greater. In the case in which the average cycle of the concavities and convexities becomes a value within the range described above, the leakage of internally propagating light can be reduced and the reflection of extraneous light can be reduced more reliably.

Also, the average height of the second concave-convex structure 12c (specifically, the average height of the second convexities 12a) is not particularly limited, but preferably is 150 nm or greater. In this case, the diffraction of internally propagating light can be reduced further. The average height of the second concave-convex structure 12c is measurable by cross-section SEM, for example. It is sufficient to measure the heights of several second convexities 12a by cross-section SEM, and take the arithmetic average value of these as the average height.

Here, the first optical layer 11 and the second optical layer 12 are made up of a cured curing resin, for example. The cured curing resin is preferably transparent. The curing resin includes a polymerizable compound and a curing initiator. The polymerizable compound is a resin that is cured by the curing initiator. The polymerizable compound may be a compound such as a polymerizable epoxy compound or a polymerizable acrylic compound, for example. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber and urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids or the like), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl) ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane diacrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactam, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers.

The curing initiator is a material that cures the curing resin. Examples of the curing initiator include thermal curing initiators and light-curing initiators, for example. The curing initiator may also be one that cures by some kind of energy beam other than heat or light (for example, an electron beam) or the like. In the case in which the curing initiator is a thermal curing initiator, the curing resin is a thermosetting resin, whereas in the case in which the curing initiator is a light-curing initiator, the curing resin is a light-curing resin.

Herein, from the perspective of transparency of the optical body 1, the curing initiator preferably is an ultraviolet-curing initiator. An ultraviolet-curing initiator is a type of light-curing initiator. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one. Consequently, the curing resin preferably is an ultraviolet-curing resin. From the perspective of transparency, the curing resin more preferably is an ultraviolet-curing acrylic resin.

In addition, the first optical layer 11 and the second optical layer 12 may be a resin imparted with functionality such as hydrophilicity, water repellency, anti-fogging, and the like.

Additionally, additives may also be added to the first optical layer 11 and the second optical layer 12 depending on the purpose of the optical body 1. Examples of additives include inorganic fillers, organic fillers, leveling agents, surface conditioners, and antifoaming agents. Note that examples of types of inorganic fillers include metallic oxide particles such as $SiO_2$, $TiO_2$, $ZrO_2$, $SnO_2$, and $Al_2O_3$.

Furthermore, it is preferable for the materials of the first optical layer 11 and the second optical layer 12 to be alike. As illustrated in FIG. 1, the first optical layer 11 is formed on top of the second optical layer 12. Consequently, internally propagating light passes through the interface between the first optical layer 11 and the second optical layer 12 to arrive inside the first optical layer 11. Consequently, to reduce reflections at the interface, it is preferable for the materials of the first optical layer 11 and the second optical layer 12 to be alike. Furthermore, it is also preferable for the materials of the first optical layer 11 and the second optical layer 12 to be alike with the material of the base material 10. As an example, the base material 10, the first optical layer 11, and the second optical layer 12 may all include an acrylic resin.

In addition, the second optical layer 12 may be formed directly on both sides of the base material 10, but a resin film (for example, a thermoplastic resin film) on which the second optical layer 12 is formed may also be bonded to both sides of the base material 10.

Figure 4:
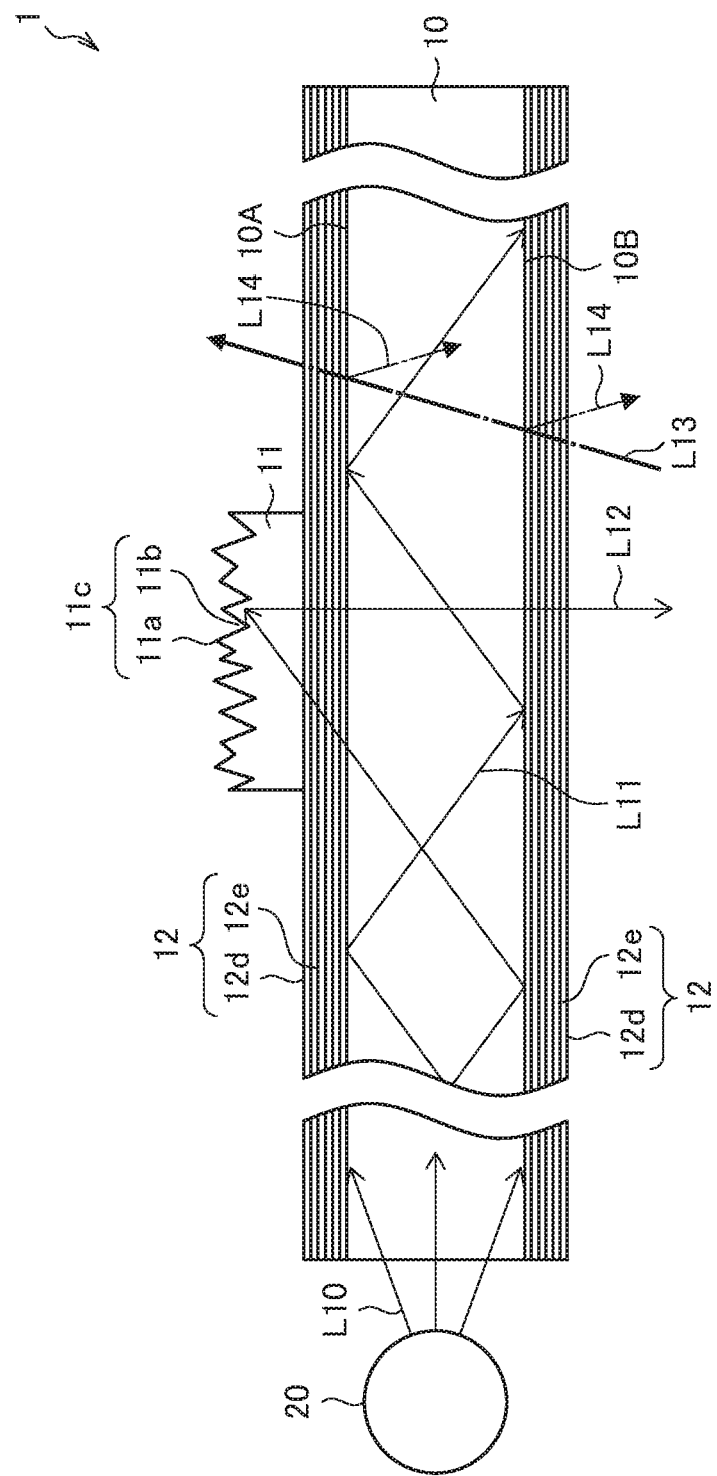
FIG. 4 is a lateral cross-section view illustrating an example of the second optical layer.
Figure 23:
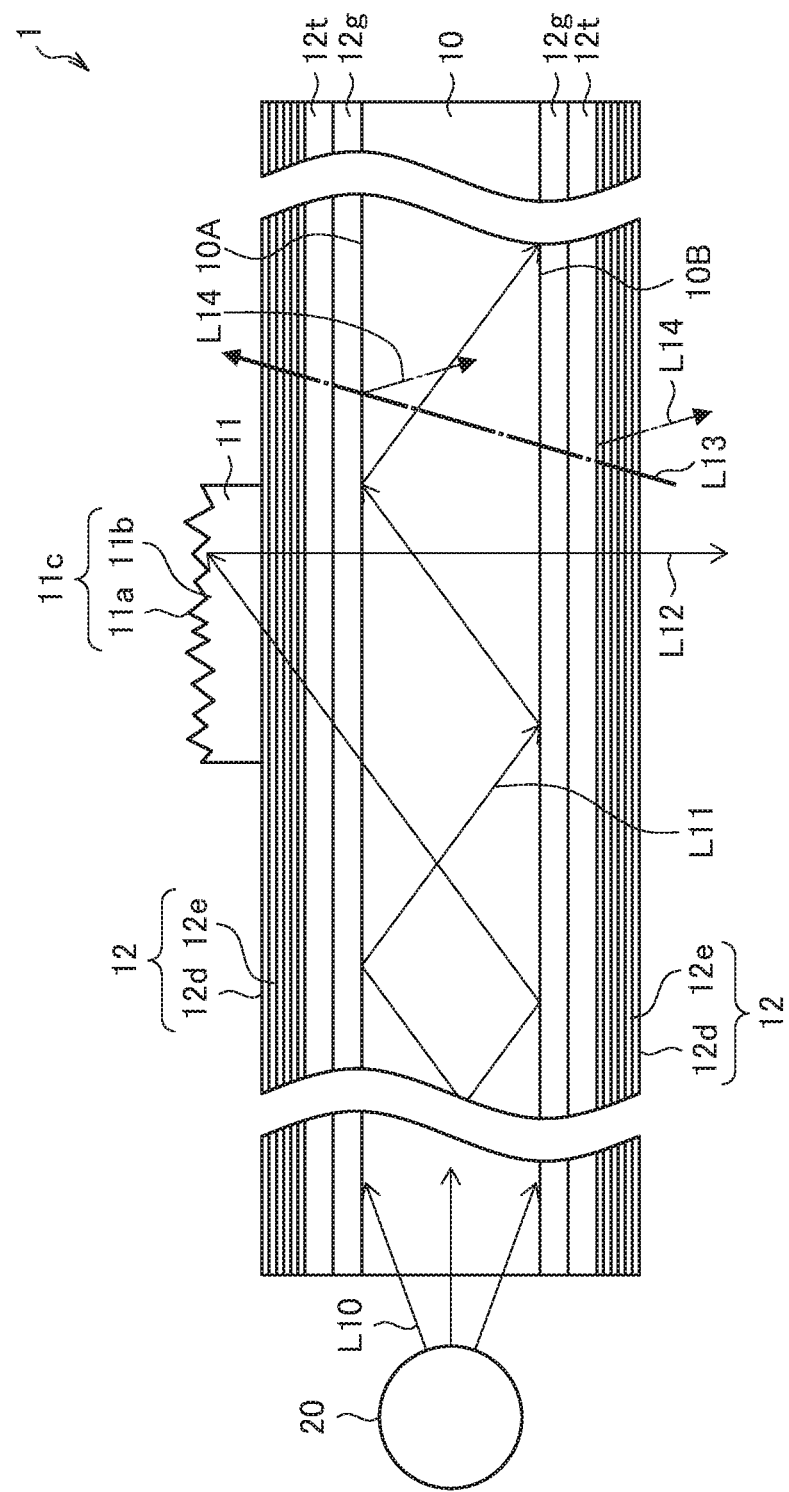
FIG. 23 is a lateral cross-section view illustrating an example of the second optical layer.

As illustrated in FIG. 4, the second optical layer 12 may also be a laminated film (what is called an AR film) in which a high refractive index film 12d and a low refractive index film 12e are alternately laminated. Even with such a laminated film, the reflection of extraneous light can be reduced, and the leakage of internally propagating light can be reduced. Herein, the high refractive index film 12d is a film having a higher refractive index than the low refractive index film 12e. The combination of the high refractive index film 12d and the low refractive index film 12e may be (high refractive index film, low refractive index film)=($Nb_2O_5$, $SiO_2$), ($TiO_2$, $SiO_2$), ($HfO_2$, $SiO_2$), or the like. Obviously, the material included in each film is not limited to these examples. The lamination order and the number of layers of the high refractive index film 12d and the low refractive index film 12e are not particularly limited. Since the properties of the second optical layer 12 tend to improve as the number of layers becomes greater, it is sufficient to decide the number of layers, the materials, and the like according to the properties demanded of the optical body 1 and the like. In addition, the thickness of each film also is not particularly limited, and is sufficiently a thickness that an AR film may take. The second optical layer 12 may be formed directly on both sides of the base material 10, but a resin film (for example, a thermoplastic resin film) on which the second optical layer 12 is formed may also be bonded to both sides of the base material 10. A specific example is illustrated in FIG. 23. In this example, the second optical layer 12 is formed on top of a thermoplastic resin film (base material film) 12t. Additionally, the base material film 12t on which the second optical layer 12 is formed is bonded to both sides of the base material 10 via an adhesive layer (for example, double-sided tape) 12g.

Note that the thickness of the second optical layer 12 is not particularly limited, and it is sufficient to adjust the thickness appropriately in accordance with the properties demanded of the optical body 1 and the like.

<2. Configuration of Light-Emitting Apparatus>

Next, the configuration of the light-emitting apparatus will be described on the basis of FIG. 1. The light-emitting apparatus includes the optical body 1 described above and the light source 20. The type of the light source 20 is not particularly specified, and is sufficiently a light source applied to a light guide panel of the related art. In other words, the light source 20 may be a light source that emits white light, or a light source that emits monochromatic light. The operation of the light-emitting apparatus is summarized below. First, light is incident on the optical body 1 from the light source 20. Light incident inside the optical body 1, or in other words, internally propagating light, propagates inside the optical body 1 while reflecting off both sides of the base material 10. Herein, since the second optical layer 12 is formed on both sides of the optical body 1, the leakage of the internally propagating light to the outside can be reduced.

A part of the internally propagating light reaches the first optical layer 11. The internally propagating light reaching the first optical layer 11 reflects off the first concave-convex structure 11c, and is extracted to the outside from the surface 10B. The mode of the light extracted to the outside, or in other words the extracted light, depends on the shape of the first concave-convex structure 11c.

Furthermore, in the case in which the second optical layer 12 includes the second concave-convex structure 12c, the average cycle of the concavities and convexities is lower than the visible light wavelength band. For this reason, the reflection of extraneous light can be reduced. Consequently, since the optical body 1 has an excellent anti-reflection function with respect to extraneous light, a viewer can be made to see a more vivid light emission pattern (that is, the light emission pattern due to the extracted light). In other words, the contrast between the light-emitting region and the non-light-emitting region is raised.

<3. Method for Manufacturing Optical Body>

Next, a method for manufacturing the optical body 1 will be described. The method for manufacturing the optical body 1 includes a second optical layer formation step, an uncured resin layer formation step, and a first optical layer formation step.

(3-1. Second Optical Layer Formation Step)

The second optical layer formation step is a step of forming the second optical layer 12 on the surfaces 10A and 10B of the base material 10. First, a method for forming the second concave-convex structure 12c on the surfaces 10A and 10B of the base material 10 as the second optical layer 12 will be described.

(3-1-1. Configuration of Master)

Figure 5:
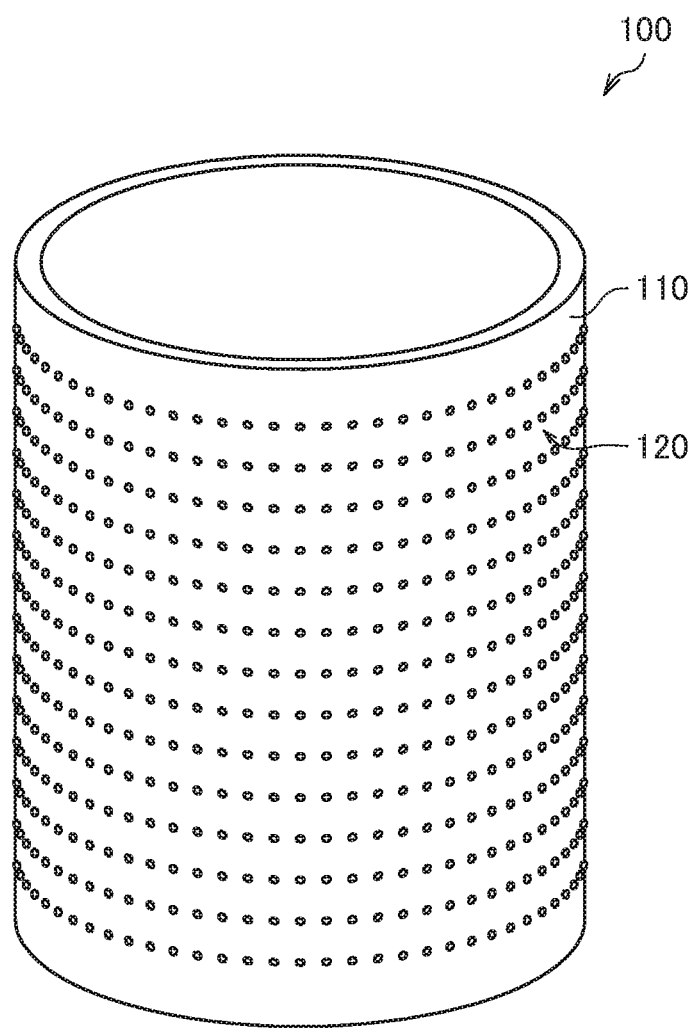
FIG. 5 is a perspective view illustrating an exemplary appearance of a master for a second concave-convex structure according to the present embodiment.

The second concave-convex structure 12c is produced using the second concave-convex structure master 100 illustrated in FIG. 5, for example. Accordingly, the configuration of the second concave-convex structure master 100 will be described next. The second concave-convex structure master 100 is a master used in a nanoimprint method, and has a hollow round cylindrical shape, for example. The second concave-convex structure master 100 may also have a round columnar shape, or another shape (for example, a planar shape). However, if the second concave-convex structure master 100 has a round columnar or hollow round cylindrical shape, a concave-convex structure 120 of the second concave-convex structure master 100 (in other words, the master concave-convex structure) may be transferred seamlessly to a resin base material or the like with a roll-to-roll method. Consequently, the second concave-convex structure 12c may be formed with high production efficiency on the surface 10A and surface 10A and the surface 10B of the base material 10. From such a perspective, the shape of the second concave-convex structure master 100 is preferably a hollow round cylindrical shape or a round columnar shape.

The second concave-convex structure master 100 is provided with a master base material 110, and the master concave-convex structure 120 formed on the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix. The shape of the master base material 110 is a hollow round cylindrical shape, but may also be a round columnar shape, or some other shape. However, as described above, the master base material 110 preferably has a hollow round cylindrical shape or a round columnar shape. The master concave-convex structure 120 has the inverse shape of the second concave-convex structure 12c.

(3-1-2. Method of Manufacturing Master)

Next, a method of manufacturing the second concave-convex structure master 100 will be described. First, a base material resist layer is formed (deposited) on the master base material 110. At this point, the resist constituting the base material resist layer is not particularly limited, and may be either an organic resist or an inorganic resist. Examples of organic resists include novolac-type resist and chemically-amplified resist. Also, examples of inorganic resists include metallic oxides including one or multiple types of transition metals such as tungsten (W) or molybdenum (Mo). However, in order to conduct thermal reaction lithography, the base material resist layer preferably is formed with a thermo-reactive resist including a metallic oxide.

In the case of using an organic resist, the base material resist layer may be formed on the master base material 110 by using a process such as spin coating, slit coating, dip coating, spray coating, or screen printing. Also, in the case of using an inorganic resist for the base material resist layer, the base material resist layer may be formed by sputtering.

Next, by exposing part of the base material resist layer with an exposure device 200 (see FIG. 6), a latent image is formed on the base material resist layer. Specifically, the exposure device 200 modulates laser light 200A, and irradiates the base material resist layer with the laser light 200A. Consequently, part of the base material resist layer irradiated by the laser light 200A denatures, and thus a latent image corresponding to the master concave-convex structure 120 may be formed in the base material resist layer.

Next, by dripping a developing solution onto the base material resist layer in which is formed the latent image, the base material resist layer is developed. As a result, a concave-convex structure is formed in the base material resist layer. Subsequently, by etching the master base material 110 and the base material resist layer using the base material resist layer as a mask, the master concave-convex structure 120 is formed on the master base material 110. Note that although the etching method is not particularly limited, dry etching that is vertically anisotropic is preferable. For example, reactive ion etching (RIE) is preferable. By the above steps, the second concave-convex structure master 100 is produced. Note that anodic porous alumina obtained by the anodic oxidation of aluminum may also be used as the master. Anodic porous alumina is disclosed in WO 2006/059686, for example. Additionally, the second concave-convex structure master 100 may also be produced by a stepper using a reticle mask with an asymmetric shape.

(3-1-3. Configuration of Exposure Device)

Figure 6:
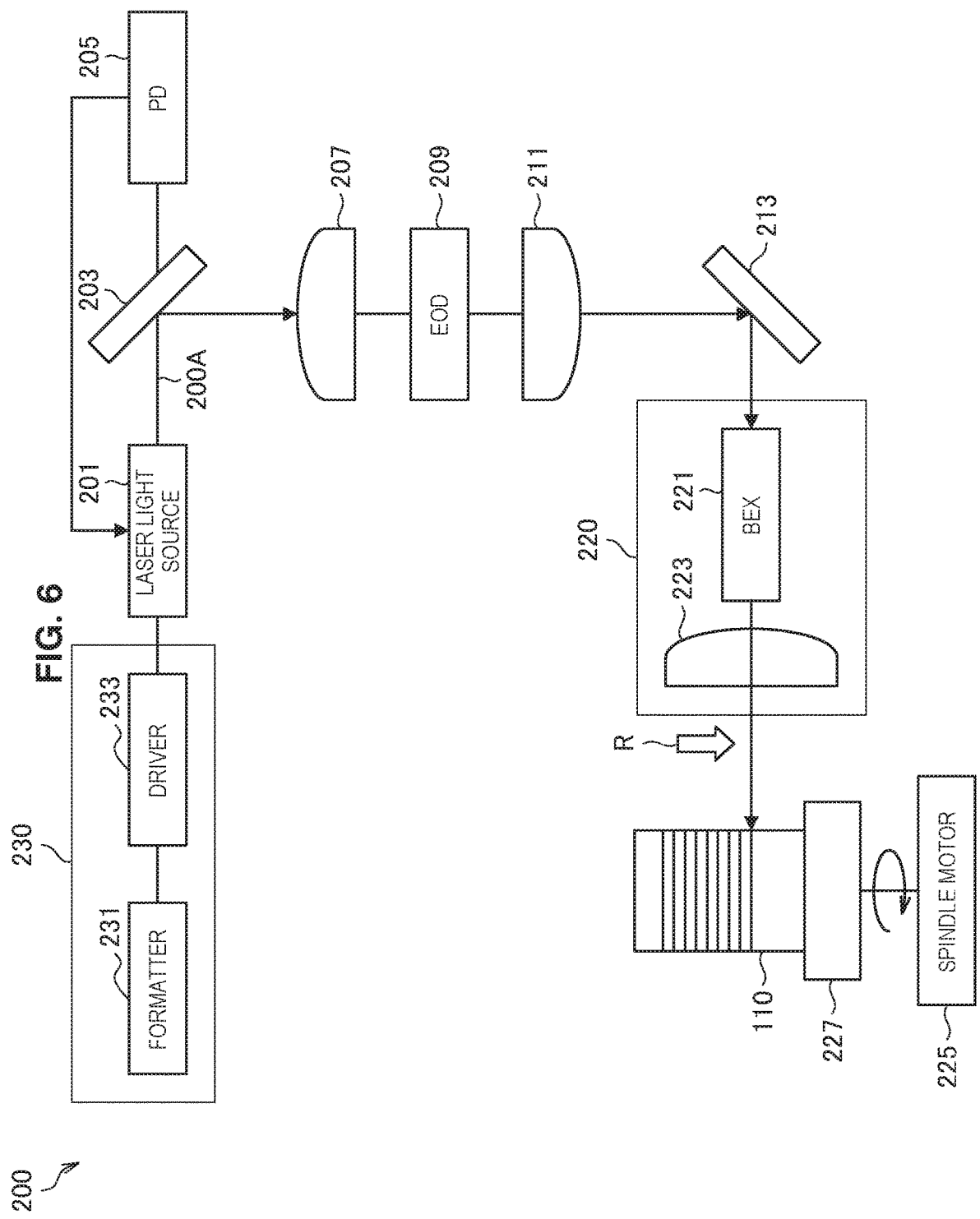
FIG. 6 is a block diagram illustrating an exemplary configuration of an exposure device.

Next, the configuration of the exposure device 200 will be described on the basis of FIG. 6. The exposure device 200 is a device that exposes the base material resist layer. The exposure device 200 is provided with a laser light source 201, a first mirror 203, a photodiode (PD) 205, a deflecting optical system, a control mechanism 230, a second mirror 213, a movable optical table 220, a spindle motor 225, and a turntable 227. Also, the master base material 110 is placed on the turntable 227 and able to be rotated.

The laser light source 201 is a light source that emits laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. Also, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is sensed by the photodiode 205 and photoelectrically converted. Also, the photodetection signal photoelectrically converted by the photodiode 205 is input into the laser light source 201, and the laser light source 201 conducts phase modulation of the laser light 200A on the basis of the input photodetection signal.

In addition, the deflecting optical system is provided with a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also able to vary the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 is provided with a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. With this arrangement, the laser light 200A is made to scan over the base material resist layer. At this point, a latent image of the base material resist layer is formed along the scanning direction of the laser light 200A.

In addition, the control mechanism 230 is provided with a formatter 231 and a driver 233, and controls the radiation of the laser light 200A. The formatter 231 generates a modulation signal that controls the radiation of the laser light 200A, and the driver 233 controls the laser light source 201 on the basis of the modulation signal generated by the formatter 231. As a result, the irradiation of the master base material 110 by the laser light 200A is controlled.

The formatter 231 generates a control signal for irradiating the base material resist layer with the laser light 200A, on the basis of an input image depicting an arbitrary pattern to draw on the base material resist layer. Specifically, first, the formatter 231 acquires an input image depicting an arbitrary draw pattern to draw on the base material resist layer. The input image is an image corresponding to a development of the outer circumferential surface of the base material resist layer, in which the outer circumferential surface of the base material resist layer is cut in the axial direction and expanded in a single plane. In the development view, an image corresponding to the circumferential shape of the second concave-convex structure master 100 is drawn. This image illustrates the inverse shape of the second concave-convex structure 12c. Note that a transfer film to which the master concave-convex structure 120 of the second concave-convex structure master 100 has been transferred may be produced, and the second concave-convex structure 12c may be formed on the base material 10 using the transfer film as a transfer mold. In this case, the master concave-convex structure 120 has the same concave-convex structure as the second concave-convex structure 12c.

Next, the formatter 231 partitions the input image into sub-regions of a predetermined size (for example, partitions the input image into a lattice), and determines whether or not the concavity draw pattern (in other words, a pattern corresponding to the concavities of the second concave-convex structure master 100) is included in each of the sub-regions. Subsequently, the formatter 231 generates a control signal to perform control to irradiate with the laser light 200A each sub-region determined to include the concavity draw pattern. The control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. As a result, the irradiation of the base material resist layer by the laser light 200A is controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may irradiate the base material resist layer after being split into multiple optical subsystems. In this case, multiple irradiation spots are formed on the base material resist layer. In this case, when the laser light 200A emitted from one optical system reaches the latent image formed by another optical system, exposure may be ended.

Consequently, according to the present embodiment, a latent image corresponding to the draw pattern of the input image can be formed in the resist layer. Additionally, by developing the resist layer and using the developed resist layer as a mask to etch the master base material 110 and the base material resist layer, the master concave-convex structure 120 corresponding to the draw pattern of the input image is formed on the master base material 110. In other words, an arbitrary master concave-convex structure 120 corresponding to a draw pattern can be formed. Consequently, if a draw pattern in which the inverse shape of the optical body 1 is drawn is prepared as the draw pattern, the master concave-convex structure 120 having the inverse shape of the optical body 1 can be formed.

(3-1-4. Method for Forming Second Concave-Convex Structure Using Master)

Figure 7:
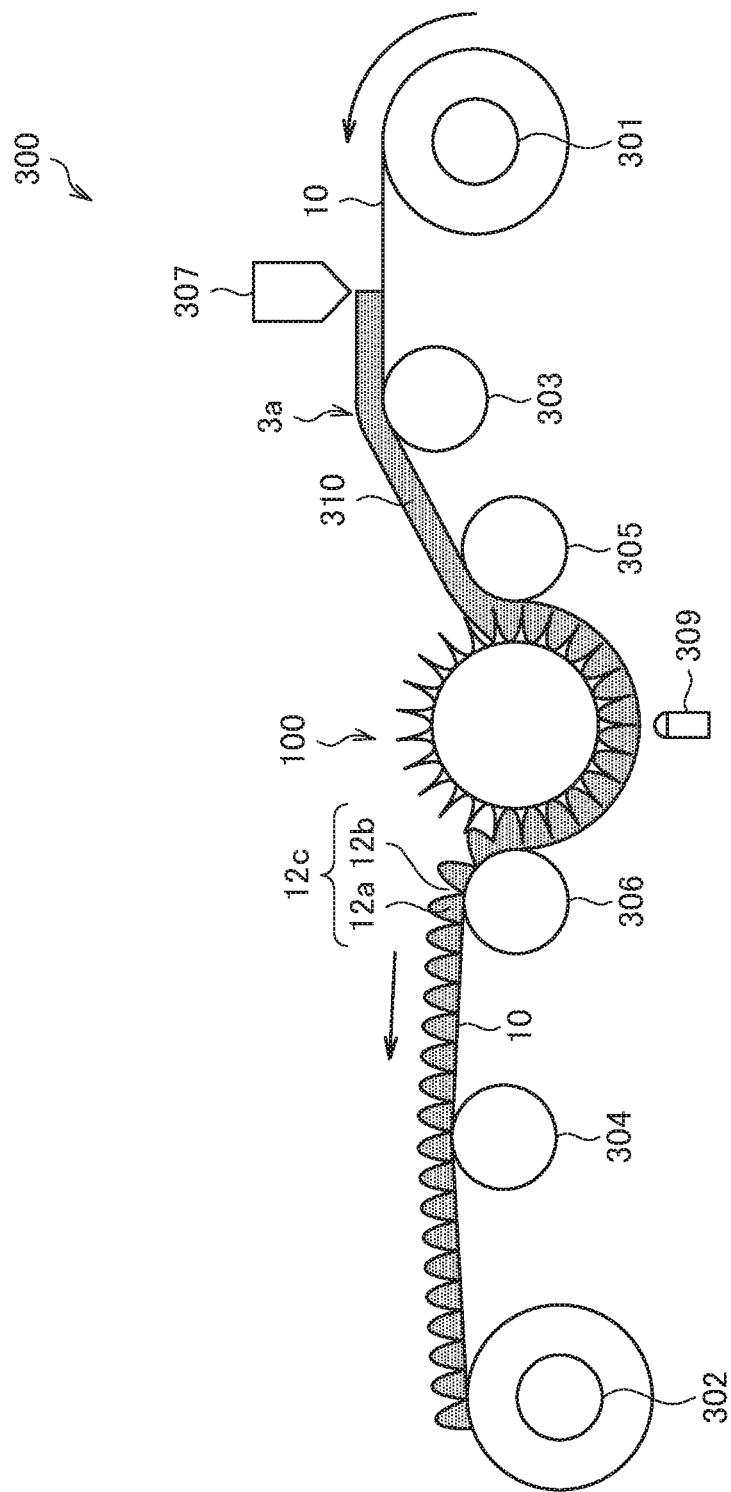
FIG. 7 is a schematic diagram illustrating an example of a transfer device that manufactures an optical body by roll-to-roll.

Next, FIG. 7 will be referenced to describe an example of a method for forming the second concave-convex structure 12c using the second concave-convex structure master 100. The second concave-convex structure 12c can be formed on the base material 10 by a roll-to-roll transfer device 300 using the second concave-convex structure master 100. In the transfer device 300 illustrated in FIG. 7, the optical body 1 is produced using a light-curing resin (ultraviolet-curing resin).

The transfer device 300 is provided with the second concave-convex structure master 100, a base material supply roll 301, a take-up roll 302, guide rolls 303 and 304, a nip roll 305, a separation roll 306, an applicator device 307, and a light source 309.

The base material supply roll 301 is a roll around which a long-length base material 10 is wound in a roll, while the take-up roll 302 is a roll that takes up the optical body 1. Also, the guide rolls 303 and 304 are rolls that transport the base material 10. The nip roll 305 is a roll that puts the base material 10 laminated with an uncured resin layer 310, or in other words a transfer film 3a, in close contact with the second concave-convex structure master 100. The separation roll 306 is a roll that separates the optical body 1 from the second concave-convex structure master 100.

The applicator device 307 is provided with an applicating means such as a coater, and applies an uncured light-curing resin composition to the base material 10, and forms the uncured resin layer 310. The applicator device 307 may be a device such as a gravure coater, a wire bar coater, or a die coater, for example. Also, the light source 309 is a light source that emits light of a wavelength able to cure the light-curing resin composition, and may be a device such as an ultraviolet lamp, for example.

In the transfer device 300, first, the base material 10 is sent continuously from the base material supply roll 301 via the guide roll 303. Note that partway through the delivery, the base material supply roll 301 may also be changed to a base material supply roll 301 of a separate lot. The uncured light-curing resin composition is applied by the applicator device 307 to the delivered base material 10, and the uncured resin layer 310 is laminated onto the base material 10. As a result, the transfer film 3a is prepared. The transfer film 3a is put into close contact with the second concave-convex structure master 100 by the nip roll 305. The light source 309 irradiates with light the uncured resin layer 310 put in close contact with the second concave-convex structure master 100, thereby curing the uncured resin layer 310. With this arrangement, the arrangement pattern of the master concave-convex structure 120 formed on the outer circumferential face of the second concave-convex structure master 100 is transferred to the uncured resin layer 310. In other words, the second concave-convex structure 12c having the inverse shape of the master concave-convex structure 120 is formed on the base material 10. Next, the base material 10 in which the second concave-convex structure 12c is formed is separated from the second concave-convex structure master 100 by the separation roll 306. Next, the base material 10 in which the second concave-convex structure 12c is formed is taken up by the take-up roll 302 via the guide roll 304. Note that the second concave-convex structure master 100 may be oriented vertically or oriented horizontally, and a mechanism that corrects the angle and eccentricity of the second concave-convex structure master 100 during rotation may also be provided separately. For example, an eccentric tilt mechanism may be provided in a chucking mechanism. The transfer may also be performed by pressure transfer.

In this way, in the transfer device 300, the circumferential shape of the second concave-convex structure master 100 is transferred to the transfer film 3a while transporting the transfer film 3a roll-to-roll. With this arrangement, the second concave-convex structure 12c is formed on the base material 10.

Note that in the case of treating the base material 10 as a thermoplastic resin film, the applicator device 307 and the light source 309 become unnecessary. In this case, a heater device is disposed farther upstream than the second concave-convex structure master 100. The base material 10 is heated and softened by the heater device, and after that, the base material 10 is pressed against the second concave-convex structure master 100. With this arrangement, the master concave-convex structure 120 formed on the circumferential face of the second concave-convex structure master 100 is transferred to the base material 10. Note that the base material 10 may also be treated as a film including a resin other than a thermoplastic resin, and the base material 10 and a thermoplastic resin film may be laminated. In this case, the laminated film is pressed against the second concave-convex structure master 100 after being heated by the heater device. Consequently, the transfer device 300 is able to continuously produce a transfer product in which the second concave-convex structure 12c is formed on the base material 10.

Also, a transfer film to which the master concave-convex structure 120 of the second concave-convex structure master 100 has been transferred may be produced, and the second concave-convex structure 12c may be formed on the base material 10 using the transfer film as a transfer mold. A transfer film to which the concave-convex structure of the transfer film has been transferred again may also be treated as a transfer mold. Also, the second concave-convex structure master 100 may be duplicated by electroforming, thermal transfer, or the like, and the duplicate may be used as a transfer mold. Furthermore, the shape of the second concave-convex structure master 100 is not necessarily limited to a roll shape, and may also be a planar master. Besides a method of irradiating resist with the laser light 200A, various processing methods can be selected, such as semiconductor exposure using a mask, electron beam lithography, machining, or anodic oxidation. Also, a resin film on which the second concave-convex structure 12c has been formed by the manufacturing methods described above may also be applied to both sides of the base material 10.

In this way, the second concave-convex structure 12c is formed on the base material 10 by transferring the concave-convex structure of the second concave-convex structure master 100 (or a transfer film to which the master concave-convex structure 120 has been transferred) onto the base material 10. Note that after forming the second concave-convex structure 12c on one surface 10A (or 10B) of the base material 10 by the transfer device 300 illustrated in FIG. 7, it is sufficient to form the second concave-convex structure 12c on the other surface 10B (or 10A). The second concave-convex structure master 100 may be shared in common regardless of the optical body 1, or the second concave-convex structure master 100 may be produced in accordance with the reflection reduction properties demanded of the optical body 1. In either case, it is not necessary to prepare the second concave-convex structure master 100 for every design of the first optical layer 11.

(3-1-5. Method for Forming AR Film)

In the case in which the second optical layer 12 is an AR film, the AR film is formed on the base material 10 by the following method. AR films are categorized into Dry-AR films and Wet-AR films. In the case of forming a Dry-AR film on the base material 10, it is sufficient to form the film material described above in alternating layers on the base material 10 by sputtering or vapor deposition. In the case of forming a Wet-AR film on the base material 10, it is sufficient to form the film material described above in alternating layers on the base material 10 by any of various types of coating methods (such as dip coating, die coating, and microgravure).

(3-2. Uncured Resin Layer Formation Step)

In the uncured resin layer formation step, an uncured resin layer is printed onto part of the second optical layer 12. Herein, the resin layer constitutes the first optical layer 11. In this step, the uncured resin layer is printed in the region that is to be the light-emitting region among the regions on the second optical layer 12. The type of printing is not particularly specified, and may be any printing method capable of printing an uncured resin layer at a desired position on the second optical layer 12. Examples of printing methods include flexo printing, screen printing, inkjet printing, gravure printing, gravure offset printing, and the like.

By these printing methods, first, an uncured curing resin composition (for example, an uncured light-curing resin composition) is printed onto part of the second optical layer 12. It is sufficient to adjust the viscosity, transparency, and the like of the composition as appropriate. Note that some printing methods require a master for printing. Although it is necessary to prepare such a master for every design, the master for printing can be manufactured much more cheaply and easily than a master having a concave-convex structure formed on the surface. If a master is unnecessary, like with inkjet printing, the resin layer can be formed more easily and cheaply. Consequently, a variety of resin layers with different designs can be formed on the second optical layer 12 easily and cheaply.

(3-3. First Optical Layer Formation Step)

Figure 8:
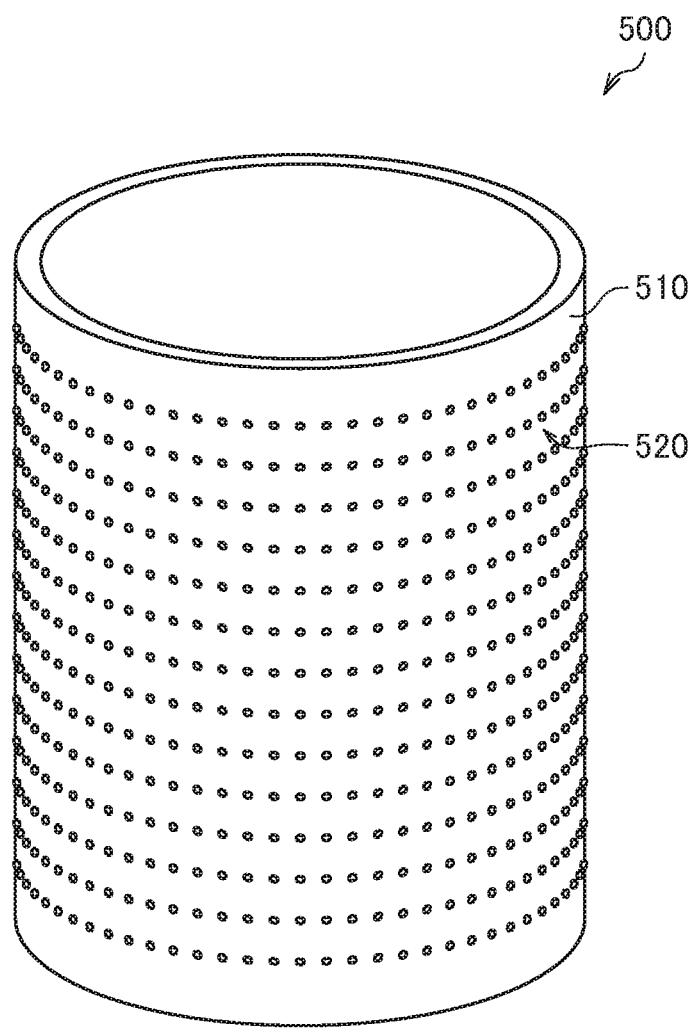
FIG. 8 is a perspective view illustrating an exemplary appearance of a master for the first concave-convex structure according to the present embodiment.

In the first optical layer formation step, the uncured resin layer is cured, while in addition, the first concave-convex structure 11c is formed on the surface of the cured resin layer. Specifically, as illustrated in FIG. 8, a first concave-convex structure master 500 is produced. On the surface of the first concave-convex structure master 500, a master concave-convex structure 520 is formed, in which the master concave-convex structure 520 has the inverse shape of the first concave-convex structure 11c.

In the case in which the cross-sectional shape of the first concave-convex structure 11c is random shapes (atypical shapes), the surface of a master base material 510 is roughened by an abrasion method such as blasting. With this arrangement, the master concave-convex structure 520 is formed on the surface of the master base material 510. In the case in which the cross-sectional shape of the first concave-convex structure 11c is a specific shape, the master concave-convex structure 520 is formed on the surface of the master base material 510 by a method similar to the second concave-convex structure master 100. It is sufficient for the material of the master base material 510 to be similar to the second concave-convex structure master 100.

Next, the master concave-convex structure 520 of the first concave-convex structure master 500 is put in close contact with the uncured resin layer. The uncured resin layer is cured while in this state. With this arrangement, the master concave-convex structure 520 of the first concave-convex structure master 500 is transferred to the cured resin layer. It is sufficient to perform this step using a device similar to the transfer device 300 described above. A transfer film to which the master concave-convex structure 520 of the first concave-convex structure master 500 has been transferred may be produced, and the transfer film may be used as a transfer mold.

In this step, the first concave-convex structure master 500 is required, but it is not necessary to prepare the first concave-convex structure master 500 for every design. This is because the uncured resin layer is already formed in the desired design. In other words, the uncured resin layer formed in the desired design projects out from the second concave-convex structure 12c. For this reason, by uniformly pressing the first concave-convex structure master 500 against the face on which the uncured resin layer is formed, the master concave-convex structure 520 of the first concave-convex structure master 500 is transferred only to the portions where the uncured resin layer is formed, and the first concave-convex structure 11c is formed.

Herein, as described above, in the case in which the first concave-convex structure 11c is formed randomly, RSm of the first concave-convex structure 11c preferably is from 30 μm to 210 μm. In the case of producing the first concave-convex structure master 500 by an abrasion method such as blasting (in other words, in the case in which the master concave-convex structure 520 is random shapes), for example, if the grain size of the abrasive becomes smaller or the abrasion time becomes longer, RSm becomes smaller. Conversely, if the grain size of the abrasive becomes larger, RSm becomes larger. In addition, RSm is adjustable according to the shape of the abrasive (heteromorphic pointed grains: shapes like jagged rocks, round beads, or the like), the quality of the abrasive, and the like. Regarding the material quality, RSm can be controlled according to the combination of the material quality of the master base material and the abrasive.

Furthermore, in the case in which the cross-sectional shape of the first concave-convex structure 11c is a random shape, RSm/Ra of the first concave-convex structure 11c preferably is 140 or less. In this case, the first concave-convex structure master 500 is produced by an abrasion method such as blasting. Consequently, it is sufficient to perform blasting or the like such that RSm/Ra takes a value within the range described above. For example, by performing wet etching after blasting, there is a tendency for fine roughness to be taken away, with large concavities and convexities remaining. In other words, the surface becomes relatively gentle. For this reason, RSm of RSm/Ra increases preferentially. With this arrangement, RSm/Ra can be adjusted.

Furthermore, in the case in which the cross-sectional shape of the first concave-convex structure 11c is hemispherical, the maximum inclination angle $\theta_{Ln}$ of the first concave-convex structure 11c preferably is approximately in agreement with the maximum propagation angle $\theta_0$. In this case, the first concave-convex structure master 500 is produced by a method similar to the second concave-convex structure master 100. Consequently, it is sufficient to design the master concave-convex structure 520 such that the maximum inclination angle $\theta_{Ln}$ of the first concave-convex structure 11c is approximately in agreement with the maximum propagation angle $\theta_0$.

As described above, according to the present embodiment, the first optical layer 11 is formed on top of part of the second optical layer 12. Consequently, a resin layer that acts as the base of the first optical layer 11 can be formed by printing. Since the resin layer is already formed in the desired design, the first concave-convex structure 11c can be formed on the surface of the resin layer using a common master (the first concave-convex structure master). In other words, it is not necessary to produce a first concave-convex structure master for every design. Furthermore, it is not necessary to form the first concave-convex structure 11c and the second concave-convex structure 12c on a single master. Consequently, the optical body 1 can be produced more easily.

By producing the first concave-convex structure master 500 and the second concave-convex structure master 100 in accordance with the use and the like of the optical body 1, first optical layers 11 and second optical layers 12 having a variety of emitted luminance and reflection reduction properties can be produced. With this arrangement, it is possible to accommodate low-volume/high-variation production of the optical body 1, and the productivity of the optical body 1 is raised. Note that in the case in which the cross-sectional shape of the first concave-convex structure 11c is random shapes, the first concave-convex structure 11c may be formed by directly blasting the surface of the cured resin layer. In this case, it is preferable to mask and protect the second optical layer 12.

1. Example 1

Next, examples of the present embodiment will be described. In Example 1, the optical body 1 was prepared according to the following steps.

(1-1. Preparation of Base Material)

As the base material 10, an acrylic panel (Acrylite, made by Mitsubishi Rayon Co., Ltd.) with a thickness of 3 mm was prepared.

(1-2. Second Optical Layer Formation Step)

In Example 1, the second concave-convex structure 12c was formed as the second optical layer 12. Specifically, the master base material 110 made of glass was prepared, and the second concave-convex structure master 100 was produced by the method described above. Next, a transfer film was produced, on which the master concave-convex structure of the second concave-convex structure master 100 was transferred. Specifically, the transfer device 300 illustrated in FIG. 7 was used to produce a transfer film in which the master concave-convex structure of the second concave-convex structure master 100 was transferred onto one surface of a polyester film made by Toyobo Co., Ltd. with a thickness of 125 μm. Herein, the ultraviolet-curing acrylic resin composition SK1120 made by Dexerials Corporation was used as the light-curing resin composition. Additionally, the second concave-convex structure 12c was formed on both sides of the base material 10, using the transfer film as a transfer mold. Specifically, as the ultraviolet-curing acrylic resin composition, a composition mixing UVX6366 made by Toagosei Co., Ltd. and Viscoat #150 made by Osaka Organic Chemical Industry Ltd. in a 1:1 mass ratio was prepared. By coating the surfaces 10A and 10B of the base material 10 with this ultraviolet-curing acrylic resin composition, an uncured resin layer was formed. Next, the concave-convex structure of the transfer film was transferred onto the uncured resin layer, and the uncured resin layer was cured.

The second concave-convex structure 12c was arranged in a staggered layout with a dot pitch P11 of 230 nm and a track pitch P12 of 153 nm. Consequently, the average cycle of the concavities and convexities of the second concave-convex structure 12c is lower than the visible light wavelength band. The average height of the second concave-convex structure 12c was 250 nm.

Figure 9:
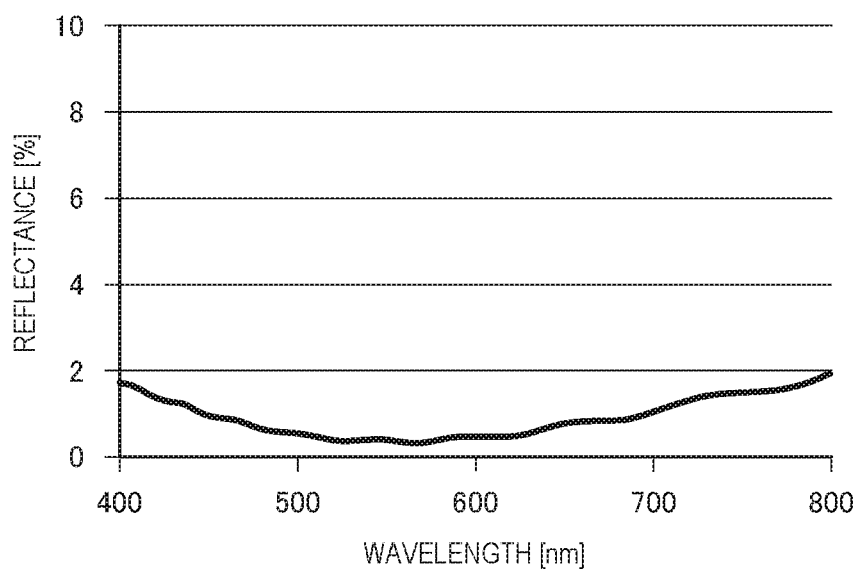
FIG. 9 is a graph illustrating an example of the spectral reflection spectrum of the second optical layer.

The spectral specular reflection spectrum of the second concave-convex structure 12c is illustrated in FIG. 9. The spectral specular reflection spectrum is measured using a spectrophotometer (model number V-550 with absolute reflectance measuring unit attached, made by JASCO Corporation). Also, the angle of incidence and the angle of reflection were both taken to be 5°, the wavelength range was taken to be from 400 nm to 800 nm, and the wavelength resolution was taken to be 1 nm. Also, the measurement light irradiated the surface 10B of the base material 10. The reflectance was measured on the basis of reflections from the surfaces 10A and 10B. As a result, the average reflectance in the range from 400 nm to 750 nm was 0.8%. The reflectance at a wavelength of 550 nm was 0.38%. Furthermore, the reflectance in the range from 450 nm to 700 nm was generally kept to 1% or less. Consequently, the structure was confirmed to have sufficient functionality as the second optical layer 12.

(1-3. Uncured Resin Layer Formation Step)

In the uncured resin layer formation step, the uncured resin layer was formed by printing an ultraviolet-curing acrylic resin composition onto part of the second optical layer 12 formed on the surface 10A side by flexo printing. Herein, the same resin composition as the resin composition used in the second optical layer formation step was used as the ultraviolet-curing acrylic resin. Flexo printing was used as the printing method.

(1-4. First Optical Layer Formation Step)

The master base material 510 made of glass was prepared. Next, the first concave-convex structure master 500 having a master concave-convex structure in which hemispherical convexities are arranged randomly was produced. The size (plan-view radius), the radius of curvature, and the fill ratio of the hemispherical shapes were adjusted such that RSm and the maximum inclination angle $\theta_{Ln}$ of the first concave-convex structure 11c take the values described later. Specifically, the size of the hemispherical shapes was set to 75 μm, the radius of curvature was set to 33 μm, and the fill ratio was set to 70%. Next, a transfer film was produced, on which the master concave-convex structure of the first concave-convex structure master 500 was transferred. Additionally, the transfer film was used as a transfer mold to transfer the concave-convex structure of the transfer film onto the uncured resin layer, and the uncured resin layer was cured. By the above steps, the optical body 1 was produced.

(1-5. Measurement of Surface Shape of Optical Body)

Figure 11:
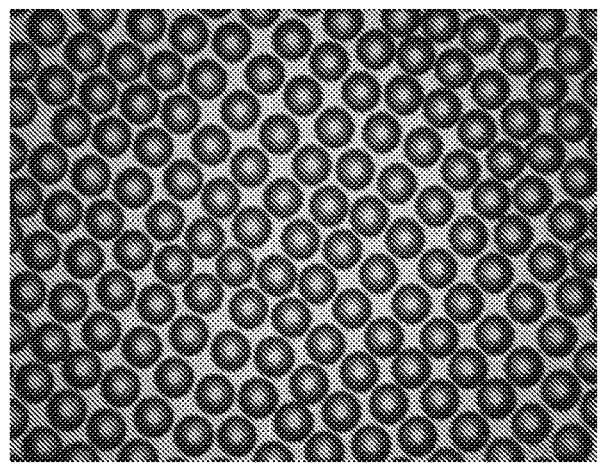
FIG. 11 is a plan-view optical micrograph illustrating an example of the first concave-convex structure.
Figure 12:
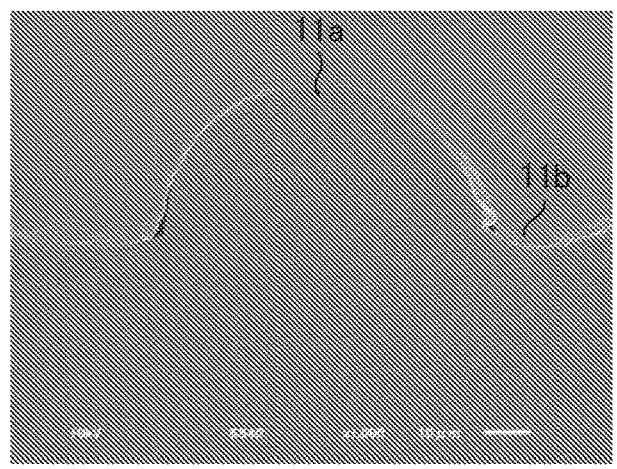
FIG. 12 is a cross-section SEM photograph illustrating an example of the first concave-convex structure.

FIG. 11 illustrates a plan-view optical micrograph (magnification ×235) of the first concave-convex structure 11c, and FIG. 12 illustrates a cross-section SEM photograph (magnification ×1000) of the first concave-convex structure 11c. When measured using the Vertscan (serial number: R5300GL-Lite-AC) made by Mitsubishi Chemical Systems, Inc., RSm of the first concave-convex structure 11c was 114.1 μm. Also, when measured using the cross-section SEM photograph, the maximum inclination angle $\theta_{Ln}$ of the first concave-convex structure 11c was 68 degrees. The results are summarized in Table 1.

(1-6. Luminance Measurement)

Next, the luminance when causing the optical body 1 to emit light was measured. Measurement was performed by the following steps. Note that measurement was performed in a dark environment. First, an LED light source (LPAC1-2430NCW-R24 made by Altec System Co., Ltd.) was installed on an edge in the row direction side of the optical body 1. Also, a luminance meter (Konica Minolta CS-1000) was installed on the surface 10B side. The installation position was set to a position 50 cm away from the surface 10B, with the optical axis of the luminance meter perpendicular to the surface 10B. Next, bright white light was incident on the optical body 1 from the LED light source, and the luminance (cd/m$^2$) was measured with the luminance meter. The luminance was measured at each of a position facing opposite the first optical layer 11 and a position facing opposite the second optical layer 12. Hereinafter, the luminance measured at the position facing opposite the first optical layer 11 will also be designated the "luminance of the first optical layer 11", while the luminance measured at the position facing opposite the second optical layer 12 will also be designated the "luminance of the second optical layer 12". The luminance of the first concave-convex structure 11c was 539 cd/m$^2$. Also, the contrast (luminance of the first concave-convex structure 11c/luminance of the second concave-convex structure 12c) was 77. A contrast at least greater than 1 was deemed acceptable, and 15 or greater was deemed favorable. The results are summarized in Table 1.

2. Evaluation

Table 1 illustrates a comparison of the evaluation of Example 1. In Example 1, favorable contrast was obtained.

Consequently, it was confirmed that favorable reflection properties are obtained by the present embodiment.

TABLE 1

|  | Example 1 |
| --- | --- |
| First optical layer | Hemispherical concavities and convexities (random arrangement) |
| RSm (μm) | 114.1 |
| Inclination angle (deg) | 68 |
| Second optical layer | Fine concavities and convexities on acrylic panel |
| Emitted luminance (cd/m$^2$) | 539 |
| Contrast | 77 |
| Assessment | Favorable |

3. Example 2

Figure 13:
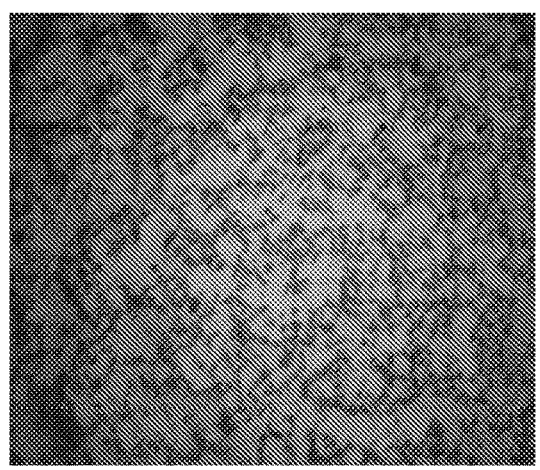
FIG. 13 is a plan-view optical micrograph illustrating an example of the first concave-convex structure.
Figure 18:
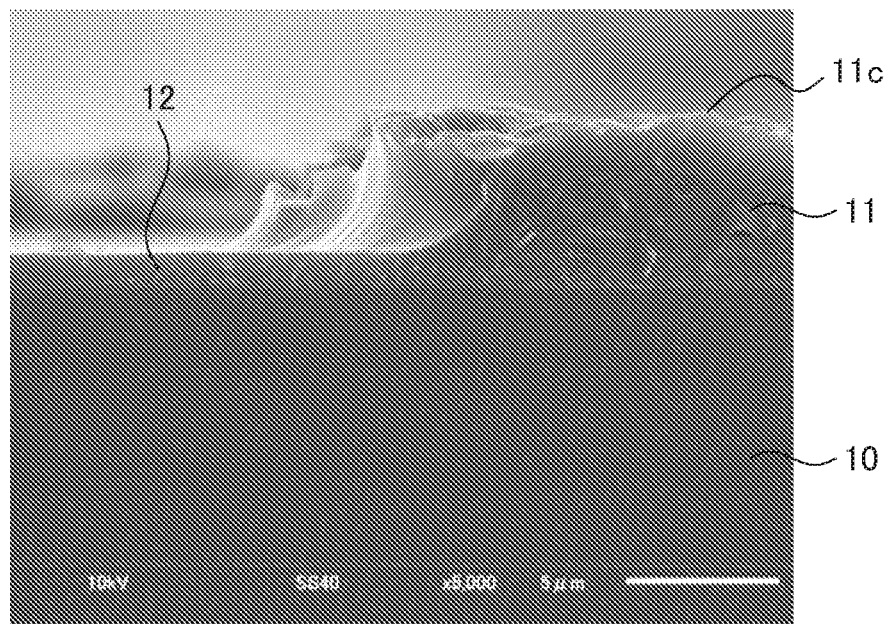
FIG. 18 is a cross-section SEM photograph illustrating an example of an optical body.
Figure 19:
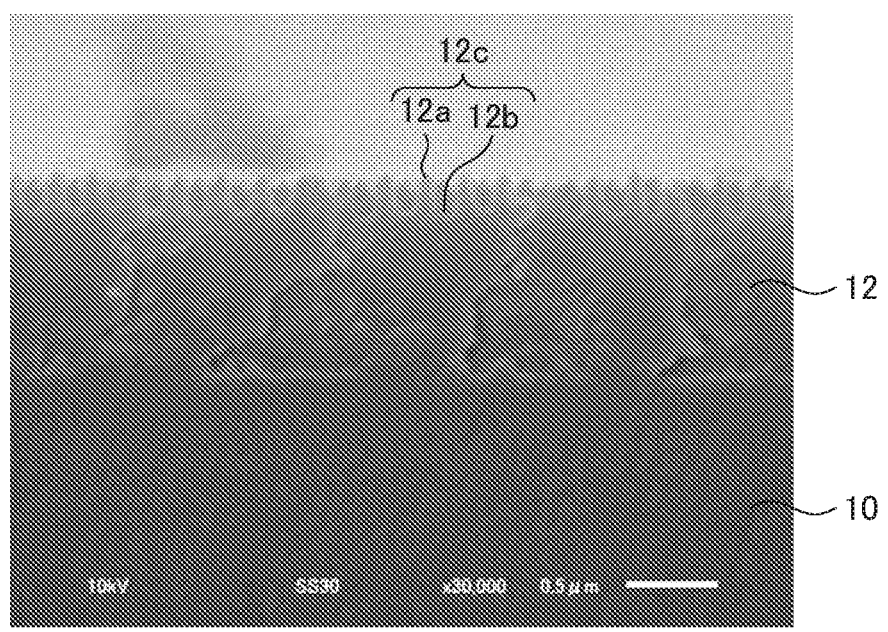
FIG. 19 is a cross-section SEM photograph illustrating an example of the second optical layer.
Figure 20:
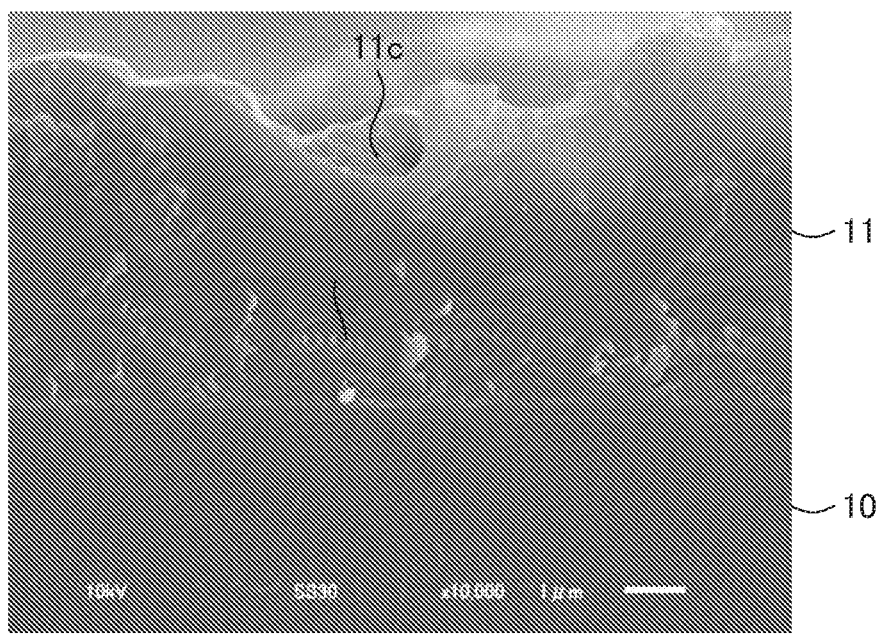
FIG. 20 is a cross-section SEM photograph illustrating an example of the boundary portion between the first optical layer and the second optical layer.

Other than changing "1-4. First optical layer formation step" to the following step, a process similar to Example 1 was performed. Namely, the surface of a master base material made of glass was subjected to blasting under conditions similar to Example 4 described later, and by performing wet etching afterward, the first concave-convex structure master 500 was produced. The blasting and the wet etching were performed such that RSm and RSm/Ra satisfy the values described later. For the abrasive, a polygonal alumina material was used. Next, a transfer film was produced, on which the master concave-convex structure of the first concave-convex structure master 500 was transferred. Additionally, the transfer film was used as a transfer mold to transfer the concave-convex structure of the transfer film onto the uncured resin layer, and the uncured resin layer was cured. By the above steps, the optical body 1 was produced. FIG. 13 illustrates a plan-view optical micrograph (magnification ×235) of the first concave-convex structure 11c. FIG. 18 illustrates a cross-section SEM photograph (magnification ×5,000) of the first optical layer 11 and the second optical layer 12. FIG. 19 illustrates a cross-section SEM photograph (magnification ×30,000) of the second optical layer 12. FIG. 20 illustrates a cross-section SEM photograph (magnification ×10,000) of the boundary portion between the first optical layer 11 and the second optical layer 12. According to these photographs, it can be confirmed that the second optical layer 12 is formed on the base material 10, the first optical layer 11 is formed on the second optical layer 12, and there is little to no collapse of the second optical layer 12 even at the boundary portion between the first optical layer 11 and the second optical layer 12. The results are summarized in Table 2.

4. Example 3

Figure 14:
FIG. 14 is a plan-view optical micrograph illustrating an example of the first concave-convex structure.

Other than changing "1-4. First optical layer formation step" to the following step, a process similar to Example 1 was performed. Namely, the surface of a master base material made of glass was subjected to blasting under conditions similar to Example 4 described later, and by performing wet etching afterward, the first concave-convex structure master 500 was produced. The blasting and the wet etching were performed such that RSm and RSm/Ra satisfy the values described later. FIG. 14 illustrates a plan-view optical micrograph (magnification ×235) of the first concave-convex structure 11c. The results are summarized in Table 2.

5. Example 4

Figure 15:
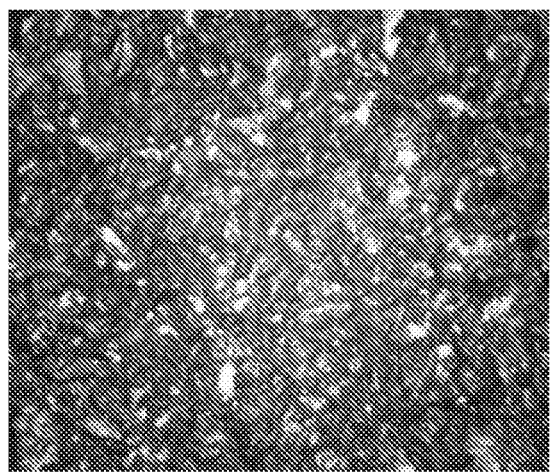
FIG. 15 is a plan-view optical micrograph illustrating an example of the first concave-convex structure.

Other than changing "1-4. First optical layer formation step" to the following step, a process similar to Example 1 was performed. Namely, the first concave-convex structure master 500 was produced by blasting the surface of a master base material made of glass. The blasting was performed such that RSm and RSm/Ra satisfy the values described later. FIG. 15 illustrates a plan-view optical micrograph (magnification ×235) of the first concave-convex structure 11c. The results are summarized in Table 2.

6. Example 5

Figure 16:
FIG. 16 is a plan-view optical micrograph illustrating an example of the first concave-convex structure.

Other than changing "1-4. First optical layer formation step" to the following step, a process similar to Example 1 was performed. Namely, after performing blasting and wet etching similar to Example 3, an ultraviolet-curing resin was applied to the surface by spin coating and cured. The blasting and the like were performed such that RSm and RSm/Ra satisfy the values described later. FIG. 16 illustrates a plan-view optical micrograph (magnification ×235) of the first concave-convex structure 11c. The results are summarized in Table 2.

7. Comparison of Evaluations of Examples 2 to 5

Table 2 illustrates a comparison of the evaluations of Examples 2 to 5. In Examples 2 to 4, favorable contrast was obtained. The reason is inferred to be that the values of RSm and RSm/Ra are within the preferable range described above. On the other hand, in Example 5, the contrast is somewhat lower. The reason is inferred to be that the value of RSm/Ra is a value outside the preferable range.

TABLE 2

|  | Example 2 | Example 3 | Example 4 | Example 5 |
| --- | --- | --- | --- | --- |
| First optical layer | Random shapes | Random shapes | Random shapes | Random shapes |
| Ra (μm) | 1.5 | 4.2 | 2.7 | 2.4 |
| RSm (μm) | 209.1 | 129.5 | 32.8 | 374 |
| RSm/Ra | 139 | 31 | 12 | 156 |
| Second optical layer | Fine concavities and convexities on acrylic panel | Fine concavities and convexities on acrylic panel | Fine concavities and convexities on acrylic panel | Fine concavities and convexities on acrylic panel |
| Emitted luminance (cd/m$^2$) | 295 | 591 | 1391 | 14 |
| Contrast | 42 | 84 | 199 | 2 |
| Assessment | Favorable | Favorable | Favorable | Acceptable |

8. Considerations Regarding RSm

Figure 17:
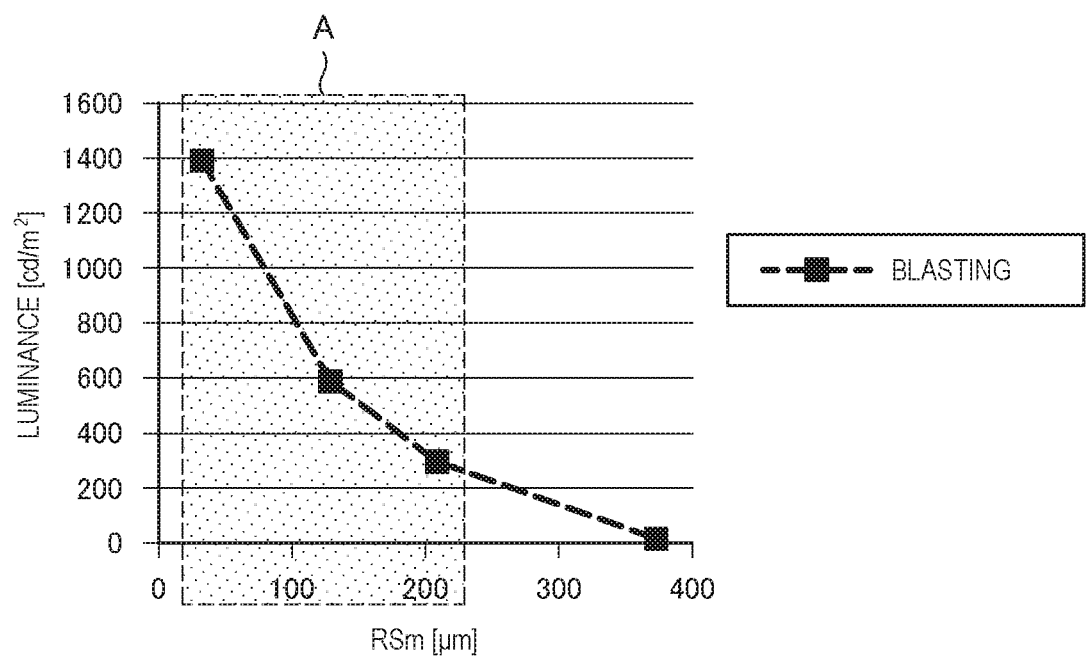
FIG. 17 is a graph illustrating a correspondence relationship between RSm and luminance.

On the basis of the results of Examples 2 to 5, the correspondence relationship between the emitted luminance and RSm of the first concave-convex structure 11c was investigated. FIG. 17 illustrates the correspondence relationship between the emitted luminance and RSm of the first concave-convex structure 11c. The region A is the region where RSm is from 30 μm to 210 μm. Inside the region A, both the emitted luminance and the contrast take high values.

In the case in which the first concave-convex structure 11c is formed by "blasting" (Examples 2 to 5), the emitted luminance becomes smaller as RSm becomes larger. The inventors think the reason for this is the following. In the case in which the first concave-convex structure 11c is formed by blasting (that is, in the case in which the cross-sectional shape is random shapes), the density of concavities and convexities becomes higher as RSm becomes smaller. Consequently, it is thought that the emitted luminance increases.

For this reason, in the case in which the cross-sectional shape of the first concave-convex structure 11c is random shapes, the upper limit value of RSm preferably is 210 μm or less, more preferably 140 μm or less, and even more preferably 50 μm or less.

9. Considerations Regarding Maximum Inclination Angle (9-1. Base Conditions)

In this test example, the maximum inclination angle of the first concave-convex structure 11c is considered by running a simulation. First, the base conditions of the simulation will be described.

For the simulation software, Zemax OpticStudio made by Zemax LLC was used. In other words, the simulation was performed by running the simulation software on a computer. As the base material 10, an acrylic panel 0.8 mm long, 0.7 mm wide, and 0.3 mm thick was used. On the surface 10A of the base material 10, as the first concave-convex structure 11c, 17 convex microlenses, that is, first convexities 11a, were arranged in a close-packed structure (fill ratio 100%, regular hexagonal close-packed arrangement) with a distance between lens apices (pitch) from 60 μm to 100 μm. Acrylic was used as the material of the first concave-convex structure 11c. Note that in this simulation, since the maximum inclination angle of the first concave-convex structure 11c is being considered, the second concave-convex structure 12c is omitted. Light sources 20 were disposed respectively at positions 0.02 mm away in the normal direction of the edge face from the four edge faces of the base material 10. The size of the light sources 20 was set to 0.6 mm long by 0.02 mm wide, with the flat portion facing opposite the edge faces of the base material 10. The radiation angle of the light sources 20 was set to 60 degrees by the full width at half maximum. Also, the total light intensity of the light emitted from each light source 20 was kept fixed in all tests. A light-receiving face 1.2 mm long by 1.2 mm wide was disposed at a position 2.0 mm away in the normal direction of the surface 10B from the surface 10B (back side). The light-receiving face was made to face opposite each surface of the base material 10. Additionally, as an index of the light extraction efficiency, the total light intensity on the light-receiving face was measured.

(9-2. Correspondence Relationship Between Maximum Inclination Angle and Maximum Propagation Angle)

Figure 24:
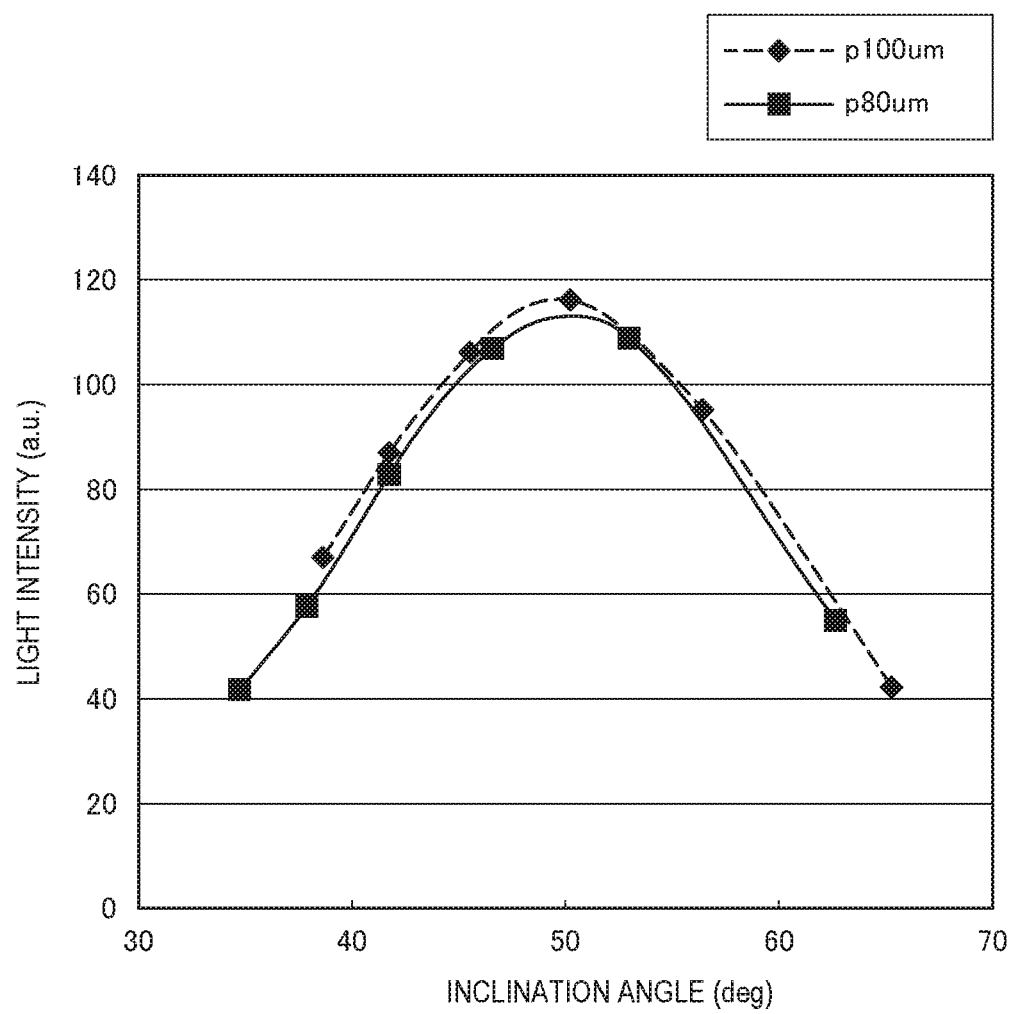
FIG. 24 is a graph illustrating a correspondence relationship between the maximum inclination angle and the light intensity of the first concave-convex structure.

The correspondence relationship between the maximum inclination angle $\theta_{Ln}$ of the first concave-convex structure 11c and the maximum propagation angle $\theta_0$ was evaluated. Specifically, by keeping the pitch fixed at either 80 μm or 100 μm, and varying the radius of curvature of the first convexities 11a, the maximum inclination $\theta_{Ln}$ of the first concave-convex structure 11c was changed. The maximum inclination angle $\theta_{Ln}$ of the first concave-convex structure 11c was taken to be the arithmetic average value of the maximum inclination angle $\theta_L$ of the 17 first convexities 11a. Subsequently, the correspondence relationship between the maximum inclination angle $\theta_{Ln}$ of the first concave-convex structure 11c and the maximum propagation angle $\theta_0$ was confirmed. The results are illustrated in FIG. 24. In FIG. 24, the horizontal axis illustrates the maximum inclination angle $\theta_{Ln}$ of the first concave-convex structure 11c, and the vertical axis illustrates the total light intensity on the back side. Note that since the material of the first concave-convex structure 11c is acrylic, n=1.49, and according to Formula (2), the maximum propagation angle $\theta_0$ becomes approximately 48 degrees.

According to FIG. 24, irrespective of the size of the pitch, the total light intensity reaches a maximum when the maximum inclination angle $\theta_{Ln}$ of the first concave-convex structure 11c is 50 degrees, or in other words, approximately in agreement with the maximum propagation angle $\theta_0$. In other words, the light extraction efficiency reaches a maximum. Furthermore, according to FIG. 24, the total light intensity becomes largest in the case in which the error between the maximum inclination angle $\theta_{Ln}$ of the first concave-convex structure 11c and the maximum propagation angle $\theta_0$ is ±3 degrees or less, with the total light intensity progressively becoming smaller as the error becomes ±5 degrees or less, ±7 degrees or less, and ±10 degrees or less.

10. Example 6

In all of the Examples 1 to 5 described above, the second optical layer 12 includes the second concave-convex structure 12c. Accordingly, the following Example 6 was performed to confirm that similar advantageous effects are obtained even if the second optical layer 12 is an AR film.

In Example 6, the properties of an AR film were confirmed by running a simulation. For the simulation software, TFCalc made by HULINKS was used. Specifically, the simulation was performed by running the simulation software on a computer. In this simulation, the base material 10 was taken to be the acrylic panel used in Example 1. Also, as the AR film, an AR film of the composition illustrated in Table 3 below was used.

TABLE 3

| Layer | Material | Thickness [nm] |
|---|---|---|
| Air | | |
| 7 | SiO$_2$ | 84.58 |
| 6 | Nb$_2$O$_5$ | 65.36 |
| 5 | SiO$_2$ | 0.48 |
| 4 | Nb$_2$O$_5$ | 43.76 |
| 3 | SiO$_2$ | 35.18 |
| 2 | Nb$_2$O$_5$ | 11.42 |
| 1 | SiO$_2$ | 145.82 |
| Base material | PMMA | 3.0 mm |
| 1 | SiO$_2$ | 145.82 |
| 2 | Nb$_2$O$_5$ | 11.42 |

TABLE 3-continued

| Layer | Material | Thickness [nm] |
|---|---|---|
| 3 | SiO$_2$ | 35.18 |
| 4 | Nb$_2$O$_5$ | 43.76 |
| 5 | SiO$_2$ | 0.48 |
| 6 | Nb$_2$O$_5$ | 65.36 |
| 7 | SiO$_2$ | 84.58 |
| Air | | |

Figure 10:
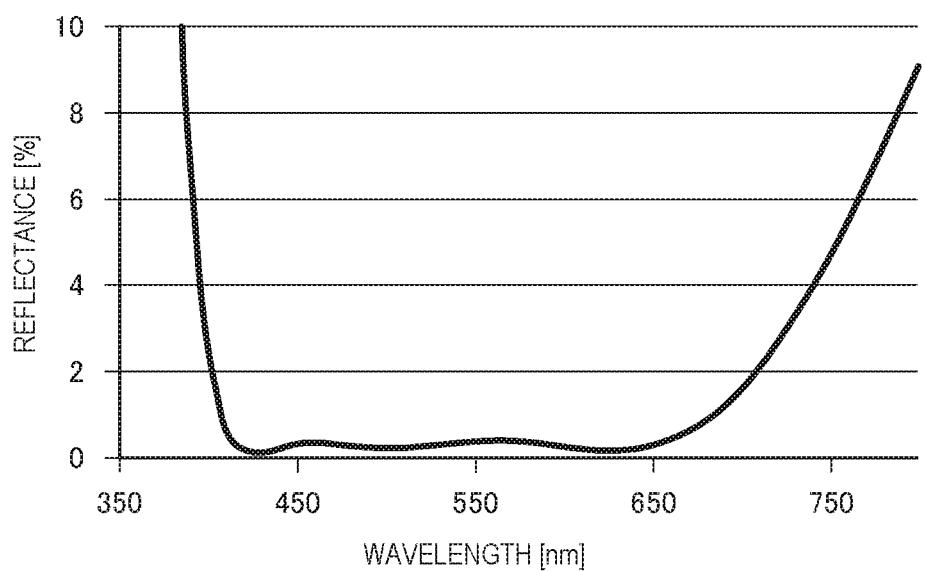
FIG. 10 is a graph illustrating an example of the spectral reflection spectrum of the second optical layer.

Additionally, the spectral specular reflection spectrum was measured by the simulation. The measurement conditions were similar to Example 1. The results are illustrated in FIG. 10. As a result, the average reflectance in the range from 400 nm to 750 nm was 0.8%. The reflectance at a wavelength of 550 nm was 0.4%. Furthermore, the reflectance in the range from 400 nm to 700 nm was generally kept to 1% or less. Consequently, the structure was confirmed to have sufficient functionality as the second optical layer 12. Consequently, it is inferred that similar results will be obtained even if the second optical layer 12 of Examples 1 to 5 is replaced with an AR film. Note that a comparison of FIGS. 9 and 10 demonstrates that the wavelength dependence of the second concave-convex structure 12c is low. For example, the second concave-convex structure 12c has more favorable properties on the long-wavelength side.

11. Example 7

Figure 21:
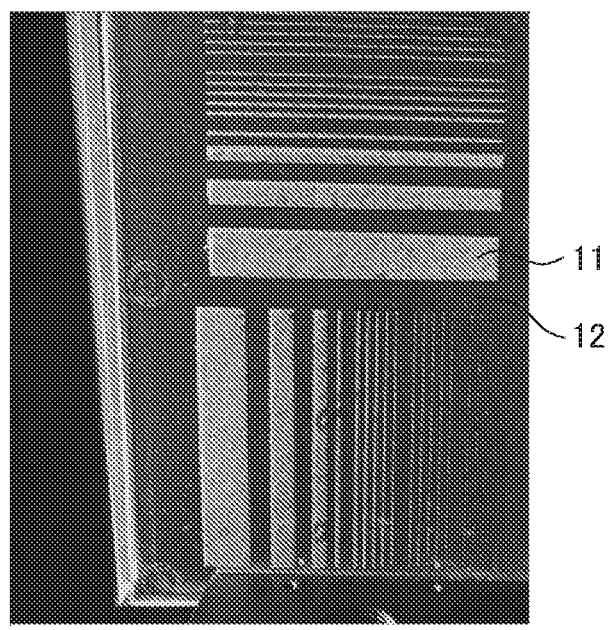
FIG. 21 is a plan-view photograph illustrating an example of an optical body.
Figure 22:
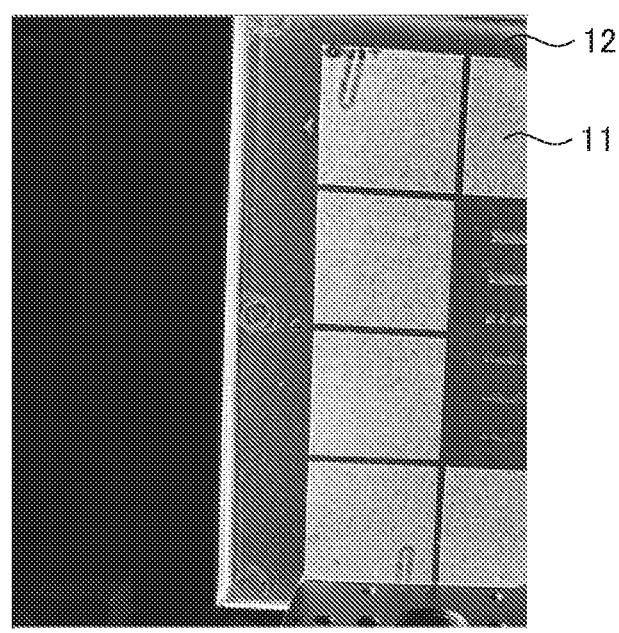
FIG. 22 is a plan-view photograph illustrating an example of an optical body.

In Example 7, the design of the first optical layer 11 was changed, and a process similar to Example 1 was performed. The design of Example 7 is illustrated in FIGS. 21 and 22. Even if the design is changed in this way, results similar to Example 1 are obtained. Also, in Examples 1 to 7, light emission from the first concave-convex structure 11c can be confirmed visually.

12. Comparative Example

An attempt was made to produce the first optical layer 11 and the second optical layer 12 of Example 1 with a single master. Specifically, an attempt was made to form the inverse shape of the first optical layer 11 (first concave-convex structure 11c) in a region of part of the master base material, and form the inverse shape of the second optical layer 12 (second concave-convex structure 12c) in another region. However, since it is necessary to produce the first concave-convex structure 11c and the second concave-convex structure 12c by different steps, production was extremely burdensome. Additionally, correctly positioning where to form the first concave-convex structure 11c was also extremely burdensome. For this reason, the manufacturing of the master, and by extension the manufacturing of the optical body, took a much longer time than Example 1.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. An optical body comprising:
   a base material;
   a second optical layer, formed on at least one surface of the base material, that reduces a reflection of extraneous light; and
   a first optical layer, laminated on top of a part of the second optical layer, that extracts internally propagating light incident inside the base material from a side face of the base material to an outside of the base material, wherein
   on a surface of the first optical layer, a first concave-convex structure that reflects the internally propagating light is formed.

2. The optical body according to claim 1, wherein the first concave-convex structure is formed randomly.

3. The optical body according to claim 2, wherein an RSm of the first concave-convex structure is from 30 μm to 210 μm.

4. The optical body according to claim 3, wherein in a case in which a cross-sectional shape of the first concave-convex structure is a random shape, an RSm/Ra of the first concave-convex structure is 140 or less.

5. The optical body according to claim 1, wherein the first concave-convex structure is formed periodically.

6. The optical body according to claim 1, wherein the first optical layer includes a cured ultraviolet-curing resin.

7. The optical body according to claim 1, wherein on a surface of the first concave-convex structure, a highly reflective film including at least one selected from the group consisting of Al, Ag, and alloys thereof, or a white-based ink film, is formed.

8. The optical body according to claim 1, wherein the second optical layer includes a second concave-convex structure in which an average cycle of concavities and convexities is lower than a visible light wavelength band.

9. The optical body according to claim 1, wherein the second optical layer includes a laminated film in which a high refractive index film and a low refractive index film are alternately laminated.

10. A method for manufacturing an optical body that manufactures the optical body according to claim 1, the method comprising:
   forming the second optical layer on at least one surface of the base material;
   printing an uncured resin layer on top of a part of the second optical layer; and
   curing the uncured resin layer and also forming the first concave-convex structure on a surface of the cured resin layer.

11. A light-emitting apparatus comprising:
   the optical body according to claim 1; and
   a light source, provided on a side face of the optical body, that causes light to be incident inside the optical body from the side face of the optical body.

12. The optical body according to claim 1, wherein the part of the second optical layer on top of which the first optical layer is laminated is less than a whole top surface of the second optical layer.

13. The method for manufacturing an optical body according to claim 10, wherein the part of the second optical layer on top of which the uncured resin layer is printed is less than a whole top surface of the second optical layer.

* * * * *